United States Patent
Suzuki et al.

(10) Patent No.: US 11,402,889 B2
(45) Date of Patent: Aug. 2, 2022

(54) STORAGE MEDIUM, JOB POWER ESTIMATION METHOD, AND JOB POWER ESTIMATING DEVICE

(71) Applicant: FUJITSU LIMITED, Kawasaki (JP)

(72) Inventors: Shigeto Suzuki, Kawasaki (JP); Takashi Shiraishi, Atsugi (JP); Takuji Yamamoto, Hachiouji (JP)

(73) Assignee: FUJITSU LIMITED, Kawasaki (JP)

( * ) Notice: Subject to any disclaimer, the term of this patent is extended or adjusted under 35 U.S.C. 154(b) by 212 days.

(21) Appl. No.: 16/865,451

(22) Filed: May 4, 2020

(65) Prior Publication Data

US 2020/0379533 A1 Dec. 3, 2020

(30) Foreign Application Priority Data

May 29, 2019 (JP) .............................. JP2019-099871

(51) Int. Cl.
*G06F 1/32* (2019.01)
*G06F 1/28* (2006.01)
*G06N 3/08* (2006.01)
*G06Q 50/06* (2012.01)

(52) U.S. Cl.
CPC ................. *G06F 1/28* (2013.01); *G06N 3/08* (2013.01); *G06Q 50/06* (2013.01)

(58) Field of Classification Search
CPC ............. G06F 1/28; G06N 3/08; G06Q 50/06
USPC ....................................................... 713/340
See application file for complete search history.

(56) References Cited

U.S. PATENT DOCUMENTS

| | | | |
|---|---|---|---|
| 2010/0082943 A1* | 4/2010 | Yamamoto | .......... G06F 15/7867 712/43 |
| 2016/0004620 A1 | 1/2016 | Ohike | |
| 2018/0144272 A1* | 5/2018 | Moroo | .................. G06F 9/5094 |
| 2018/0275176 A1* | 9/2018 | Takashima | .............. H02J 3/004 |
| 2019/0042383 A1 | 2/2019 | Querbach et al. | |
| 2019/0310291 A1* | 10/2019 | Lee | ...................... G06N 3/0445 |

(Continued)

FOREIGN PATENT DOCUMENTS

| | | |
|---|---|---|
| JP | H09-146915 A | 6/1997 |
| WO | 2014/184928 A1 | 11/2014 |

OTHER PUBLICATIONS

Extended European Search Report dated Oct. 2, 2020 for corresponding European Application No. 20172121.4, 11 pages.

(Continued)

*Primary Examiner* — Paul B Yanchus, III
(74) *Attorney, Agent, or Firm* — Fujitsu Patent Center

(57) ABSTRACT

A power estimation method includes acquiring first consumed power information indicating a change in power consumed for a first time period from a first time to a second time within a time period elapsed from the start of the execution of a first job, and second consumed power information indicating a change in power consumed for a second time period from a third time to a fourth time within the time period elapsed from the start of the execution of the first job, the third time being after the second time, generating, from the first consumed power information, a first estimation model for estimating power to be consumed by the job for the first time period, and generating, from the second consumed power information, a second estimation model for estimating power to be consumed by the job for the second time period.

15 Claims, 33 Drawing Sheets

(56) References Cited

U.S. PATENT DOCUMENTS

2019/0354153 A1\* 11/2019 Hauser .................... G06F 8/656
2020/0249740 A1\* 8/2020 Wei ......................... G06F 1/329

OTHER PUBLICATIONS

Smith, Warren et al.,"Predicting application run times with historical information", Journal of Parallel and Distributed Computing, Elsevier, Amsterdam, NL, vol. 64, No. 9, May 26, 2015, pp. 1007-1016, XP029246853.
European Office Action dated Feb. 16, 2022 for corresponding European Patent Application No. 20172121.4, 8 pages.

\* cited by examiner

FIG. 6

| | | TIME ELAPSED FROM START OF EXECUTION OF JOBS | | | | | | | | | | | | | | | | |
|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | ... 287 |
| JOB A | 1 | x | x | x | x | x | x | x | x | x | x | x | x | x | x | x | x | ... | x |
| JOB B | 2 | x | x | x | x | x | x | x | x | x | x | x | x | x | x | x | x | ... | x |
| JOB C | 3 | x | x | x | x | x | x | x | x | x | x | x | x | x | x | x | x | ... | x |
| JOB D | 4 | x | x | x | x | x | x | x | x | x | x | x | x | x | x | x | x | ... | x |
| JOB E | 5 | x | x | x | x | x | x | x | x | x | x | x | x | x | x | x | x | ... | x |
| ... | ... | ... | ... | ... | ... | ... | ... | ... | ... | ... | ... | ... | ... | ... | ... | ... | ... | ... |
| JOB xxx | 1000 | ... | ... | ... | ... | ... | ... | ... | ... | ... | ... | ... | ... | ... | ... | ... | ... | ... |

| | | COMPARATIVE EXAMPLE | FIRST MODIFICATION EXAMPLE | SECOND MODIFICATION EXAMPLE |
|---|---|---|---|---|
| DATA SET AMOUNTS | TOTAL NUMBER OF DATA SET POWER VALUES | INPUT: 6×276×1000 OUTPUT: 6×276×1000 | INPUT: 6×47×1000 OUTPUT: 6×47×1000 | INPUT: (Σ6N)×1000 (N:1~47) OUTPUT: 6×47×1000 |
| | NUMBER OF MODELS | 1 | 1 | 47 |
| | NUMBER OF DATA SET POWER VALUES (PER ESTIMATION MODEL) | INPUT: 6×276×1000 OUTPUT: 6×276×1000 | INPUT: 6×47×1000 OUTPUT: 6×47×1000 | INPUT: 6N×1000 (N:1~47) OUTPUT: 6×1000 |
| RNN SIZES | INPUT AND OUTPUT NUMBERS | INPUT6, OUTPUT6 | INPUT6, OUTPUT6 | INPUT6N, OUTPUT6 |
| | INPUT/OUTPUT | 1 | 1 | N(N:1~47) |
| CALCULATION AMOUNTS FOR LEARNING (PER ESTIMATION MODEL) | CALCULATION AMOUNT (MINIMUM AMOUNT) | 6 | 1 | 1/47 (NUMBER OF DATA ITEMS INPUT 6) |
| | CALCULATION AMOUNT (MAXIMUM AMOUNT) | 6 | 1 | 47 (NUMBER OF DATA ITEMS INPUT 6N) |
| ESTIMATION ACCURACY (EXPERIMENT RESULTS) | RELATIVE ERROR (%) | 65 | — | 8.8 |

FIG. 16

| ELAPSED TIME \ JOB NAME | JOB A | JOB B | JOB C | ... |
|---|---|---|---|---|
| 5 MINUTES (MEASUREMENT TIME POINT #0) | 20W | 10W | 40W | ... |
| 10 MINUTES (MEASUREMENT TIME POINT #1) | 30W | 12W | 20W | ... |
| 15 MINUTES (MEASUREMENT TIME POINT #2) | 20W | 11W | 30W | ... |
| ⋮ | ⋮ | ⋮ | ⋮ | ⋮ |

| JOB NAME | JOB NUMBER | TIME-SERIES POWER DATA (AT EACH MEASUREMENT TIME POINT) | | | | | |
|---|---|---|---|---|---|---|---|
| | | QUESTION DATA | | | | ANSWER DATA | |
| | | 0 | 1 | ... | ... | ... | ... |
| JOB A | 1 | 20W | 30W | ... | ... | ... | ... |
| JOB B | 2 | 30W | 35W | ... | ... | ... | ... |
| ... | ... | ... | ... | ... | ... | ... | ... |
| JOB xxx | 1000 | ... | ... | ... | ... | ... | ... |

SAMPLE DATA — 112
DATA SET (FOR ESTIMATION FOR Interval 1) — 112a
DATA SET (FOR ESTIMATION FOR Interval 2) — 112b

FIG. 19

| JOB NAME | | JOB a |
|---|---|---|
| ESTIMATION TIME | | T1 |
| POWER TO BE CONSUMED | 5 MINUTES LATER | 15W |
| | 10 MINUTES LATER | 18W |
| | 15 MINUTES LATER | 21W |
| | ⋮ | ⋮ |

FIG. 20

| | Interval 0 | | | | | | Interval 1 | | | | | | Interval 2 | | | | | | Interval 3 | | | | | | |
|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | ...287 |
| JOB A 1 | × | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ |
| JOB B 2 | × | × | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ |
| JOB C 3 | × | × | × | ○ | ○ | ○ | ○ | ○ | ○ | ○ | ○ | ○ | ○ | ○ | ○ | ○ | ○ | ○ | ○ | ○ | ○ | ○ | ○ | ○ | ○ |
| JOB D 4 | × | × | × | × | ○ | ○ | ○ | ○ | ○ | ○ | ○ | ○ | ○ | ○ | ○ | ○ | ○ | ○ | ○ | ○ | ○ | ○ | ○ | ○ | ○ |
| JOB E 5 | × | × | × | × | × | ○ | ○ | ○ | ○ | ○ | ○ | ○ | ○ | ○ | ○ | ○ | ○ | ○ | ○ | ○ | ○ | ○ | ○ | ○ | ○ |
| JOB F 6 | × | × | × | × | × | × | × | × | ○ | ○ | ○ | ○ | ○ | ○ | ○ | ○ | ○ | ○ | ○ | ○ | ○ | ○ | ○ | ○ | ○ |
| JOB G 7 | × | × | × | × | × | × | × | × | × | × | × | ○ | ○ | ○ | ○ | ○ | ○ | ○ | ○ | ○ | ○ | ○ | ○ | ○ | ○ |
| JOB H 8 | × | × | × | × | × | × | × | × | × | × | × | × | ○ | ○ | ○ | ○ | ○ | ○ | ○ | ○ | ○ | ○ | ○ | ○ | ○ |
| JOB I 9 | × | × | × | × | × | × | × | × | × | × | × | × | × | ○ | ○ | ○ | ○ | ○ | ○ | ○ | ○ | ○ | ○ | ○ | ○ |
| JOB J 10 | × | × | × | × | × | × | × | × | × | × | × | × | × | × | ○ | ○ | ○ | × | ○ | ○ | ○ | ○ | ○ | ○ | ○ |
| JOB K 11 | × | × | × | × | × | × | × | × | × | × | × | × | × | × | × | × | × | × | × | ○ | ○ | ○ | × | × | ○ |
| JOB L 12 | × | × | × | × | × | × | × | × | × | × | × | × | × | × | × | × | × | × | × | × | ○ | ○ | × | × | ○ |
| ... | ... | ... | ... | ... | ... | ... | ... | ... | ... | ... | ... | ... | ... | ... | ... | ... | ... | ... | ... | ... | ... | ... | ... | ... | ... |
| JOB xxx 1000 | × | ... | ... | ... | ... | ... | ... | ... | ... | ... | ... | ... | ... | ... | ... | ... | ... | ... | ... | ... | ... | ... | ... | ... | ... |

QUESTION DATA ← Interval 0, Interval 1

ANSWER DATA ← Interval 2, Interval 3

111

333 — DATA SET (FOR ESTIMATION FOR Interval 2)

AMOUNT OF TIME-SERIES POWER DATA OF JOBS THAT HAVE FINISHED BEING EXECUTED WITHIN ESTIMATION PERIOD OF Interval 2 IS SMALL.

FIG. 21

| | Interval 0 (QUESTION DATA) | | | | | | Interval 1 (ANSWER DATA) | | | | | | Interval 2 | | | | | | Interval 3 | | | | | | ...287 |
|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | |
| JOB A 1 | × | o | o | o | o | o | o | o | o | o | o | o | o | o | o | o | o | o | o | o | o | o | o | o | o |
| JOB B 2 | × | × | o | o | o | o | o | o | o | o | o | o | o | o | o | o | o | o | o | o | o | o | o | o | o |
| JOB C 3 | × | × | × | o | o | o | o | o | o | o | o | o | o | o | o | o | o | o | o | o | o | o | o | o | o |
| JOB D 4 | × | × | × | × | o | o | o | o | o | o | o | o | o | o | o | o | o | o | o | o | o | o | o | o | o |
| JOB E 5 | × | × | × | × | × | o | o | o | o | o | o | o | o | o | o | o | o | o | o | o | o | o | o | o | o |
| JOB F 6 | × | × | × | × | × | × | o | o | o | o | o | o | o | o | o | o | o | o | o | o | o | o | o | o | o |
| JOB G 7 | × | × | × | × | × | × | × | o | o | o | o | o | × | o | o | o | o | o | o | o | o | o | o | o | o |
| JOB H 8 | × | × | × | × | × | × | × | × | × | × | × | × | × | × | o | o | o | o | o | o | o | o | o | o | o |
| JOB I 9 | × | × | × | × | × | × | × | × | × | × | × | × | × | × | × | × | × | o | o | o | o | o | o | o | o |
| JOB J 10 | × | × | × | × | × | × | × | × | × | × | × | × | × | × | × | × | × | × | × | × | × | × | o | o | o |
| JOB K 11 | × | × | × | × | × | × | × | × | × | × | × | × | × | × | × | × | × | × | × | × | × | × | × | × | o |
| JOB L 12 | × | × | × | × | × | × | × | × | × | × | × | × | × | × | × | × | × | × | × | × | × | × | × | × | o |
| ... | | | | | | | | | | | | | | | | | | | | | | | | | |
| JOB XXX 1000 | × | × | ... | ... | ... | ... | ... | ... | ... | ... | ... | ... | ... | ... | ... | ... | ... | ... | ... | ... | ... | ... | ... | ... | ... |

111

112a — DATA SET (FOR ESTIMATION FOR Interval 1)

| | Interval 0 | | | | | | Interval 1 | | | | | | Interval 2 | | | | | | Interval 3 | | | | | | |
|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | ...287 |
| JOB A | × | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ... ○ |
| JOB B | × | × | × | ○ | ○ | ○ | ○ | ○ | ○ | ○ | ○ | ○ | ○ | ○ | ○ | ○ | ○ | ○ | ○ | ○ | ○ | ○ | ○ | ○ | ... ○ |
| JOB C | × | × | × | × | × | ○ | ○ | ○ | ○ | ○ | ○ | ○ | ○ | ○ | ○ | ○ | ○ | ○ | ○ | ○ | ○ | ○ | ○ | ○ | ... ○ |
| JOB D | × | × | × | × | × | × | ○ | ○ | ○ | ○ | ○ | ○ | ○ | ○ | ○ | ○ | ○ | ○ | ○ | ○ | ○ | ○ | ○ | ○ | ... ○ |
| JOB E | × | × | × | × | × | × | × | ○ | ○ | ○ | ○ | ○ | ○ | ○ | ○ | ○ | ○ | ○ | ○ | ○ | ○ | ○ | ○ | ○ | ... ○ |
| JOB F | × | × | × | × | × | × | × | × | ○ | ○ | ○ | ○ | ○ | ○ | ○ | ○ | ○ | ○ | ○ | ○ | ○ | ○ | ○ | ○ | ... ○ |
| JOB G | × | × | × | × | × | × | × | × | × | × | ○ | ○ | ○ | ○ | ○ | ○ | ○ | ○ | ○ | ○ | ○ | ○ | ○ | ○ | ... ○ |
| JOB H | × | × | × | × | × | × | × | × | × | × | × | × | × | × | × | × | × | ○ | ○ | ○ | ○ | ○ | ○ | ○ | ... ○ |
| JOB I | × | × | × | × | × | × | × | × | × | × | × | × | × | × | × | × | × | ○ | ○ | ○ | ○ | ○ | ○ | ○ | ... ○ |
| JOB J | × | × | × | × | × | × | × | × | × | × | × | × | × | × | × | × | × | × | × | ○ | ○ | ○ | ○ | ○ | ... ○ |
| JOB K | × | × | × | × | × | × | × | × | × | × | × | × | × | × | × | × | × | × | × | × | × | × | × | ○ | ... ○ |
| JOB L | × | × | × | × | × | × | × | × | × | × | × | × | × | × | × | × | × | × | × | × | × | × | × | × | ... ○ |
| ... | ... | ... | ... | ... | ... | ... | ... | ... | ... | ... | ... | ... | ... | ... | ... | ... | ... | ... | ... | ... | ... | ... | ... | ... | ... |
| JOB XXX 1000 | ... | ... | ... | ... | ... | ... | ... | ... | ... | ... | ... | ... | ... | ... | ... | ... | ... | ... | ... | ... | ... | ... | ... | ... | ... |

QUESTION DATA: Interval 0, Interval 1, Interval 2
ANSWER DATA: Interval 3

111

112c DATA SET (FOR ESTIMATION FOR Interval 3)

FIG. 30

|  | AVERAGE ERROR IN APPLIED TECHNIQUE | AVERAGE ERROR IN COMPARATIVE EXAMPLE |
|---|---|---|
| NORMAL JOB THAT CONSUMES POWER OF LESS THAN 2 MW | 5.5% | — |
| LARGE JOB THAT CONSUMES POWER OF 2 MW OR MORE | 8.8% | 65.0% |

STORAGE MEDIUM, JOB POWER ESTIMATION METHOD, AND JOB POWER ESTIMATING DEVICE

CROSS-REFERENCE TO RELATED APPLICATION

This application is based upon and claims the benefit of priority of the prior Japanese Patent Application No. 2019-99871, filed on May 29, 2019, the entire contents of which are incorporated herein by reference.

FIELD

The embodiments discussed herein are related to a job power estimation program, a job power estimation method, and a job power estimating device.

BACKGROUND

In a large computer system (hereinafter merely referred to as system) such as a high performance computing (HPC) system, a large amount of power is consumed. Therefore, to stably operate the system, it is important to appropriately manage power consumption of the system. For example, when the power consumption of the system is able to be maintained at a fixed level, a load applied to a power supply facility is small.

To manage the power consumption of the system, it is desirable that a demand for power to be consumed by the system be able to be estimated in advance. As a method of estimating power to be consumed by the entire system, a method of identifying a similar job from past job input information including job names and the like, treating power to be consumed by the identified job as an estimated value, and estimating power to be consumed by an input job is considered.

After a job starts being executed, power to be consumed by the job is able to be estimated by regression based on a time-series change (power waveform) in power consumed by a job being executed until the current time. The total of power to be consumed by all jobs being executed may be obtained by summing results of estimating power to be consumed by the jobs being executed.

As a technique able to be used to estimate power to be consumed, for example, a detecting device for detecting correlation relationships from various data generated from an information technology (IT) system has been proposed. A chaotic time-series short-term estimating device that characteristically handles time-series data targeted for estimation to improve the accuracy of estimation has been proposed.

For example, as related art, International Publication Pamphlet No. WO 2014/184928, Japanese Laid-open Patent Publication No. 9-146915, and the like have been disclosed.

SUMMARY

According to an aspect of the embodiments, a power estimation method includes acquiring first consumed power information indicating a change in power consumed for a first time period from a first time to a second time within a time period elapsed from the start of the execution of a first job, and second consumed power information indicating a change in power consumed for a second time period from a third time to a fourth time within the time period elapsed from the start of the execution of the first job, the third time being after the second time, generating, from the first consumed power information, a first estimation model for estimating power to be consumed by the job for the first time period, and generating, from the second consumed power information, a second estimation model for estimating power to be consumed by the job for the second time period.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating an example of time-series power information of jobs;

FIG. 11 is a diagram illustrating a learning model generation example comparison table;

FIG. 16 is a diagram illustrating an example of job consumed power information;

FIG. 17 is a diagram illustrating an example of sample data;

FIG. 19 is a diagram illustrating an example of estimation result information;

FIG. 20 is a diagram illustrating an example (reference example) of the generation of a data set;

FIG. 21 is a diagram illustrating a first example of the generation of a data set;

FIG. 22 is a diagram illustrating a second example of the generation of a data set;

FIG. 23 is a diagram illustrating a third example of the generation of a data set;

FIG. 30 is a diagram illustrating comparison of an average error in an applied technique with an average error in a comparative example;

DESCRIPTION OF EMBODIMENTS

As a method of estimating power to be consumed by a job being executed, a method using a recurrent neural network (RNN) is considered. The RNN is a neural network supporting time-series data. For example, a computer uses the RNN to generate an estimation model for estimating power to be consumed, based on time-series power information indicating a time-series change in power consumed by a job executed in the past. The computer may use the estimation model to estimate transition of power to be consumed by a job being executed. However, an estimation model of one type is generated based on time-series changes in power consumed by all jobs, data (time-series power data) indicating time-series changes in power consumed by the individual jobs varies, and thus a learning result does not converge. Therefore, even when power to be consumed by a job being executed is estimated by the generated estimation model, the accuracy of the estimation may not be expected to be high.

According to an aspect, an object of the present disclosure is to improve the accuracy of the estimation of power to be consumed by a job.

According to an aspect, the accuracy of the estimation of power to be consumed by a job is improved.

Hereinafter, embodiments are described with reference to the drawings. Each of the embodiments may be implemented by combining multiple embodiments with each other without any contradiction.

First Embodiment

First, a first embodiment is described.

Figure 1:
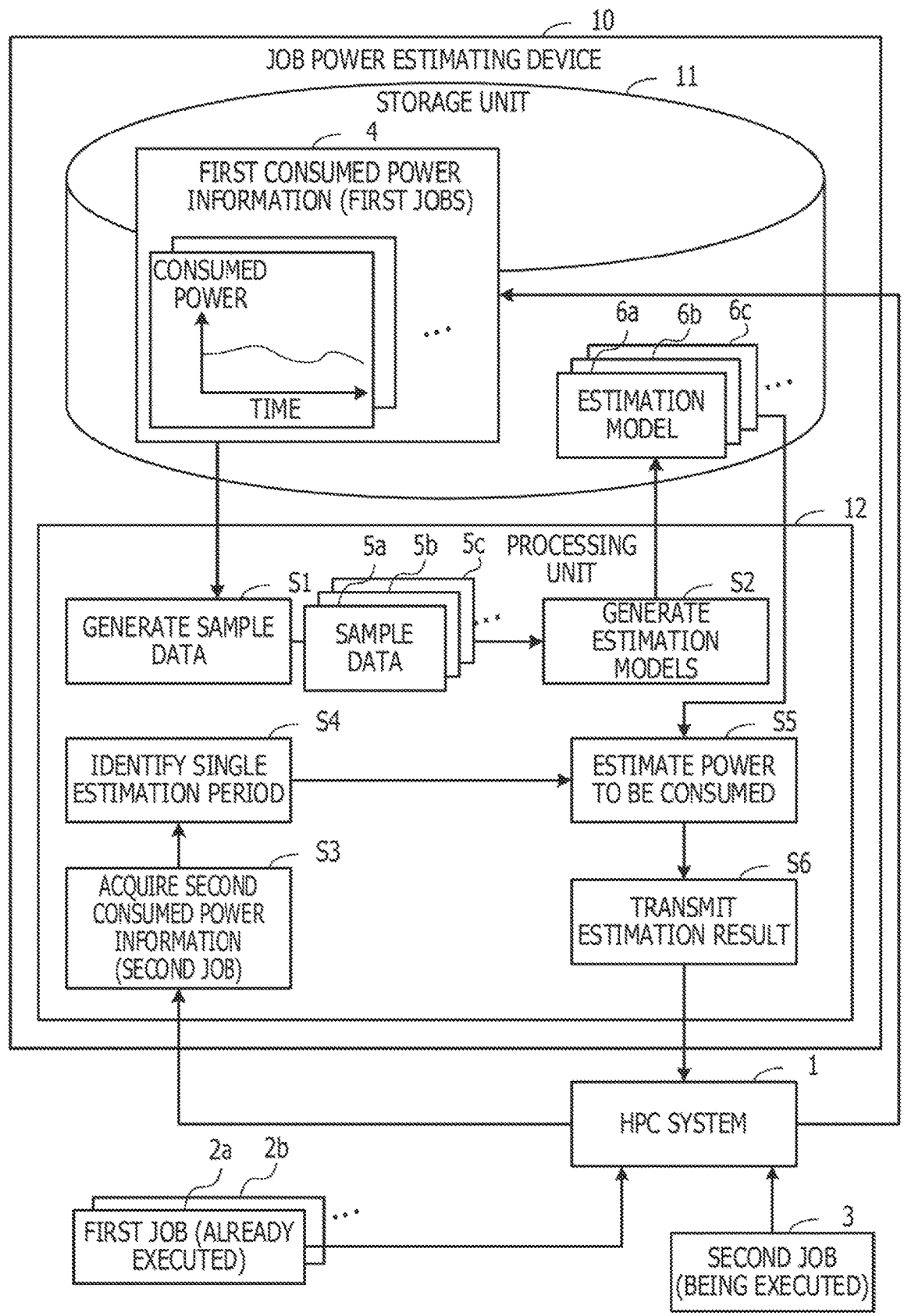
FIG. 1 is a diagram illustrating an example of a job power estimation method according to a first embodiment.

FIG. 1 is a diagram illustrating an example of a job power estimation method according to a first embodiment. FIG. 1 illustrates a job power estimating device 10 that executes the job power estimation method. The job power estimating device 10 may execute the job power estimation method by, for example, executing a job power estimation program describing a process procedure for the job power estimation method.

The job power estimating device 10 is coupled to, for example, an HPC system 1. The HPC system 1 estimates a time-series change in power to be consumed by a job being executed. The job power estimating device 10 includes a storage unit 11 and a processing unit 12 to realize the job power estimation method. The storage unit 11 is, for example, a memory included in the job power estimating device 10 or a storage device. The processing unit 12 is, for example, a processor included in the job power estimating device 10 or arithmetic circuitry.

The storage unit 11 stores first consumed power information 4 and a plurality of estimation models 6a, 6b, 6c, . . . . The first consumed power information 4 is information indicating time-series changes in power consumed by a plurality of first jobs 2a, 2b, . . . during the execution of the first jobs 2a, 2b, . . . that have finished being executed. The estimation models 6a, 6b, 6c, . . . are information to be used to estimate time-series changes in power to be consumed by the plurality of first jobs 2a, 2b, . . . for each of a plurality of estimation periods defined by time intervals within a time period elapsed from the start of the execution of the first jobs 2a, 2b, . . . . The estimation models 6a, 6b, 6c, . . . are, for example, neural networks.

The processing unit 12 generates, based on the first consumed power information 4, sample data 5a, 5b, 5c, . . . indicating time-series changes in power consumed by one or more jobs before the estimation periods associated with the sample data 5a, 5b, 5c, . . . (in step S1). For example, the processing unit 12 causes time-series changes in power consumed by the one or more first jobs for time periods before the associated estimation periods to be included as question data in the sample data 5a, 5b, 5c, . . . . The processing unit 12 causes time-series changes in power to be consumed by the one or more first jobs for the associated estimation periods to be included as answer data in the sample data 5a, 5b, 5c, . . . . The answer data is teacher data for supervised machine learning.

Next, the processing unit 12 generates estimation models 6a, 6b, 6c, . . . for estimating time-series changes in power to be consumed by the one or more jobs for the associated estimation periods, based on the sample data 5a, 5b, 5c, . . . associated with the plurality of estimation periods (in step S2). For example, the processing unit 12 uses the estimation models 6a, 6b, 6c, . . . to estimate time-series changes in power to be consumed for the associated estimation periods, based on the question data of the sample data 5a, 5b, 5c, . . . . Then, the processing unit 12 modifies the estimation models 6a, 6b, 6c, . . . based on differences between the results of the estimation and the answer data. The processing unit 12 generates the final estimation models 6a, 6b, 6c, . . . by repeatedly modifying the estimation models 6a, 6b, 6c, . . . . The processing unit 12 causes the generated estimation models 6a, 6b, 6c, . . . to be stored in the storage unit 11.

After that, the processing unit 12 acquires, from the HPC system 1, second consumed power information indicating a time-series change in power consumed by a second job 3 being executed until the current time (in step S3), For example, the processing unit 12 identifies, based on the second consumed power information, a single estimation period for estimating power to be consumed by the second job 3 based on an execution time of the second job 3 being executed until the current time (in step S4). For example, the processing unit 12 identifies an estimation period immediately after the execution time of the second job 3 until the current time as the single estimation period for estimating power to be consumed by the second job 3. Then, the processing unit 12 uses an estimation model for estimating a time-series change in power to be consumed by a job for the single estimation period to estimate a time-series change in power to be consumed by the second job for the single estimation period, based on the second consumed power information (in step S5).

The processing unit 12 transmits, for example, the result of the estimation to the HPC system 1 (in step S6). The HPC system 1 manages power consumption of the HPC system 1 based on the result of estimating power to be consumed by the second job 3. For example, when there is a probability that power to be consumed exceeds a predetermined value, the HPC system 1 executes a process of reducing the number of jobs being executed and the like.

According to the job power estimating device 10, the processing unit 12 uses appropriate sample data to generate estimation models for respective estimation periods. Then, the processing unit 12 uses an estimation model based on an execution time of the second job 3 until the current time to estimate power to be consumed by the second job 3.

Figure 2:
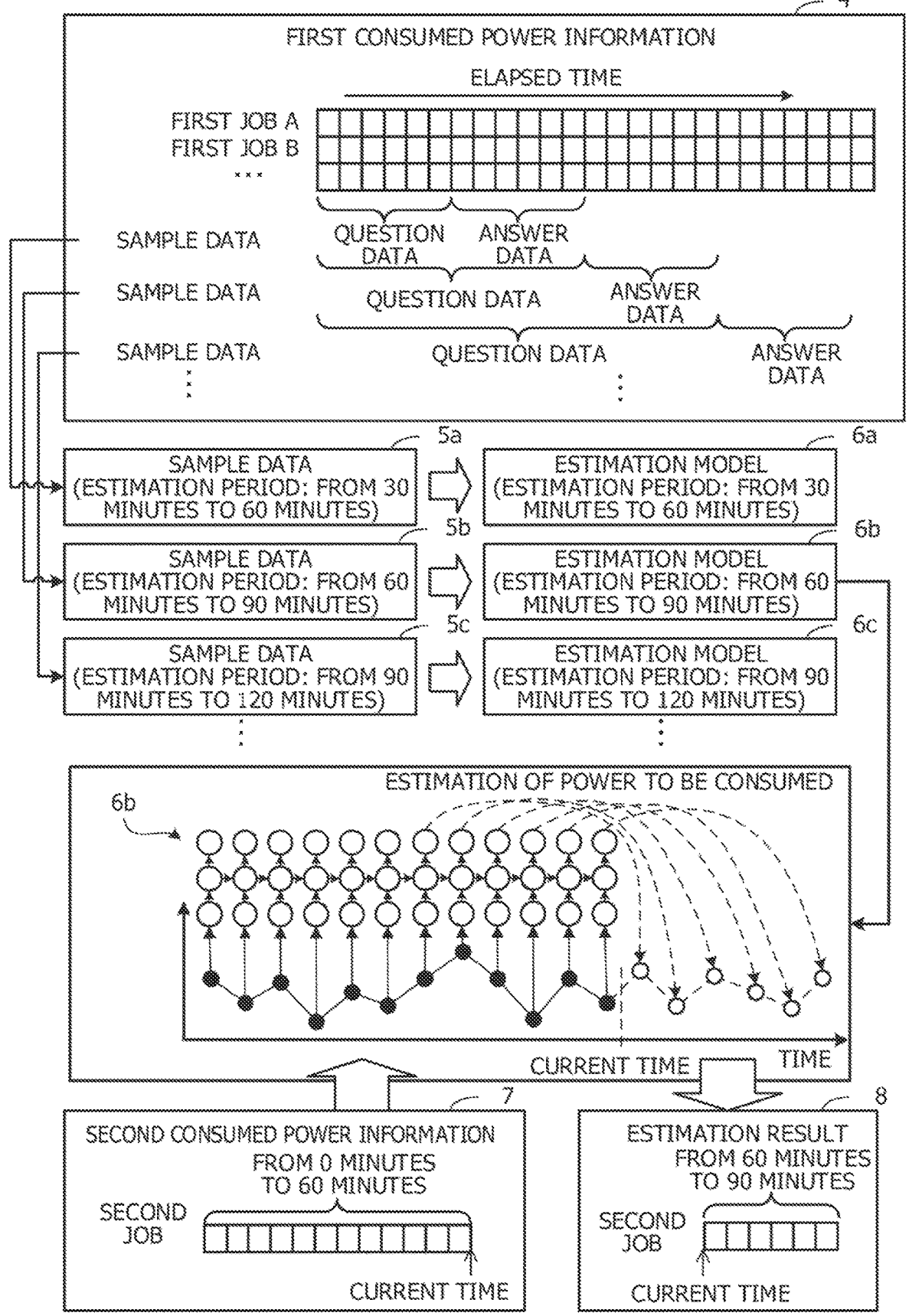
FIG. 2 is a diagram illustrating an example of a process of estimating power to be consumed by a job using a plurality of estimation models for respective estimation periods.

FIG. 2 is a diagram illustrating an example of a process of estimating power to be consumed by a job using a plurality of estimation models for respective estimation periods. In the example illustrated in FIG. 2, the processing unit 12 extracts a plurality of time periods of 30 minutes from a time axis indicating a time period elapsed after the start of the execution of the plurality of first jobs 2a, 2b, . . . and treats the extracted time periods as the estimation periods. For example, the processing unit 12 treats, as a single estimation period, a time period from 30 minutes to 60 minutes elapsed after the start of the execution of the plurality of first jobs 2a, 2b, . . . . The processing unit 12 treats, as a single estimation period, a time period from 60 minutes to 90 minutes elapsed after the start of the execution of the plurality of first jobs 2a, 2b, . . . . The processing unit 12 treats, as a single estimation period, a time period from 90 minutes to 120 minutes elapsed after the start of the execution of the plurality of first jobs 2a, 2b, . . . . In this manner, the processing unit 12 treats, as the plurality of estimation periods, the plurality of continuous time periods that do not overlap each other.

The processing unit 12 generates the sample data 5a, 5b, 5c, . . . for the respective estimation periods. In the example illustrated in FIG. 2, the processing unit 12 generates the sample data 5a, 5b, 5c, . . . indicating the time-series changes in power consumed for the time periods from the start of the execution of one or more first jobs to the ends of the associated estimation periods.

The processing unit 12 may cause information indicating time-series changes in power consumed by all the first jobs 2a, 2b, . . . to be included in the sample data 5a, 5b, 5c, . . . . The processing unit 12 may determine, for each of the estimation periods, one or more first jobs to be used to estimate power to be consumed and cause information indicating a time-series change in power to be consumed by the determined one or more jobs to be included in sample data associated with the estimation period. For example, the processing unit 12 extracts, from the plurality of first jobs, one or more first jobs whose execution times are from the start of the execution to the end of the execution and longer than a threshold determined based on an estimation period associated with sample data to be generated. The threshold is, for example, a time period immediately before the start of the estimation period. Then, the processing unit 12 generates the sample data indicating the time-series changes in power consumed by the extracted one or more first jobs.

The processing unit 12 uses the sample data 5a, 5b, 5c, . . . for the respective estimation periods to generate the estimation models 6a, 6b, 6c, . . . for the respective estimation periods. After that, the processing unit 12 acquires second consumed power information 7 of the second job 3 being executed and identifies an estimation period for estimating power to be consumed by the second job 3. In the example illustrated in FIG. 2, a time period of 60 minutes has elapsed after the start of the execution of the second job 3. In this case, the processing unit 12 identifies, as an estimation period for estimating power to be consumed by the second job 3, an estimation period from 60 minutes to 90 minutes after the start of the execution of the second job 3.

The processing unit 12 uses the estimation model 6b associated with the identified estimation period to estimate power to be consumed by the second job 3 for the estimation period (from 60 minutes to 90 minutes) based on the second consumed power information 7 and outputs an estimation result 8.

In this manner, a variation in time-series changes, included in the sample data 5a, 5b, 5c, . . . , in power to be consumed is reduced by generating, in the foregoing manner, the sample data 5a, 5b, 5c, . . . indicating the time-series changes in power consumed by the one or more first jobs before the associated estimation periods. Therefore, when the estimation models 6a, 6b, 6c, . . . are learned based on the sample data 5a, 5b, 5c, . . . , learning results appropriately converge and the estimation models 6a, 6b, 6c, . . . that enable high-accuracy estimation are generated. Then, the processing unit 12 uses, among the generated estimation models 6a, 6b, 6c, . . . , the estimation model for the estimation period corresponding to the execution time of the second job 3 until the current time to estimate power to be consumed by the second job 3, thereby improving the accuracy of the estimation of power to be consumed by the job.

Second Embodiment

Next, a second embodiment is described. In the second embodiment, an estimation model learned using a neural network is used to estimate power to be consumed by a job.

Figure 3:
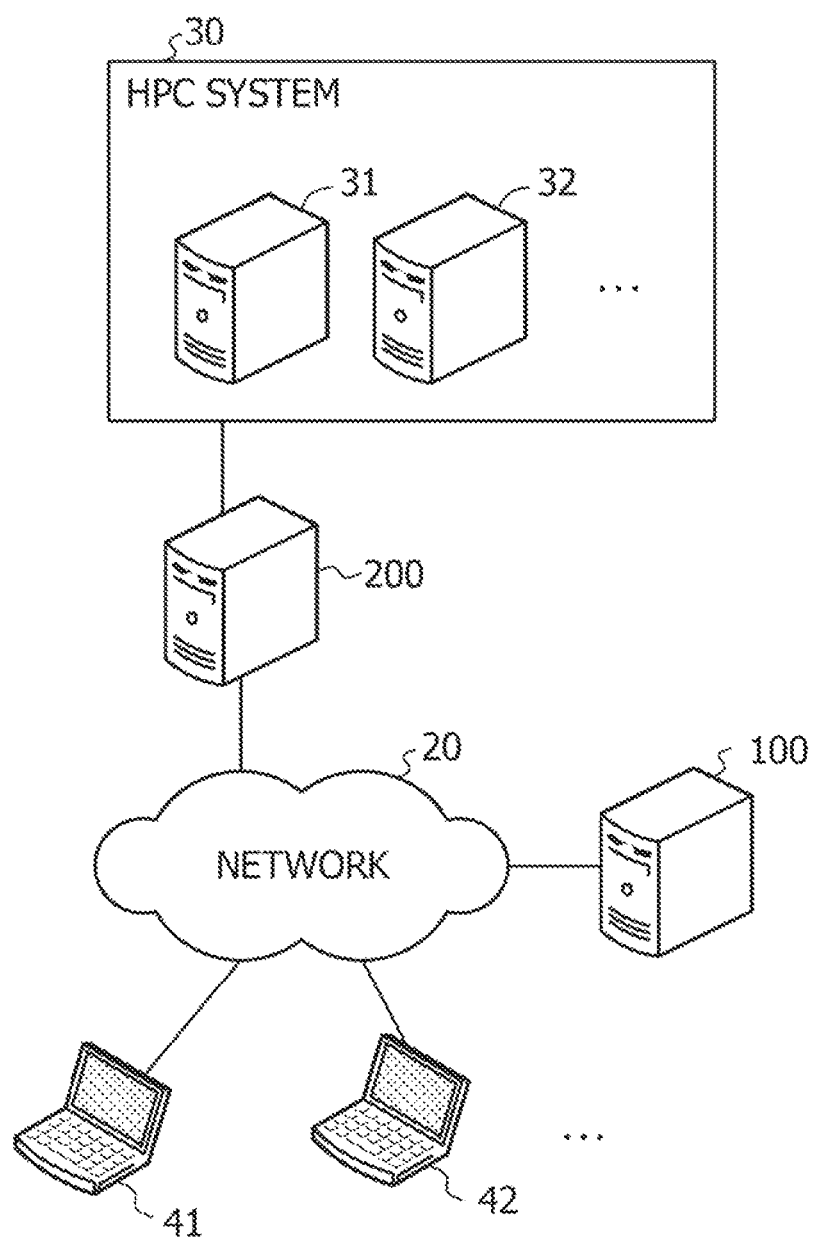
FIG. 3 is a diagram illustrating an example of a configuration of a system according to a second embodiment.

FIG. 3 is a diagram illustrating an example of a configuration of a system according to a second embodiment. An HPC system 30 includes a plurality of calculation nodes 31, 32, . . . . The calculation nodes 31, 32, . . . are computers, each of which executes an input job.

The calculation nodes 31, 32, . . . included in the HPC system 30 are coupled to an HPC operation managing server 200. The HPC operation managing server 200 is a computer that manages the operation of the HPC system 30. For example, the HPC operation managing server 200 monitors time-series changes in power consumed by the calculation nodes 31, 32, . . . during the execution of jobs. The HPC operation managing server 200 receives results of estimating patterns of power to be consumed by jobs waiting to be executed from the managing server 100 and executes job scheduling so that, for example, power to be consumed by the system is uniform. Then, the HPC operation managing server 200 instructs the calculation nodes 31, 32, . . . to execute jobs in accordance with a job execution schedule generated by the HPC operation managing server 200.

The HPC operation managing server 200 is coupled to terminal devices 41, 42, . . . and the managing server 100 via a network 20. The terminal devices 41, 42, . . . are computers to be used by users who want the HPC system 30 to execute jobs. The terminal devices 41, 42, . . . generate job information indicating details of jobs to be executed by the HPC system 30 based on input by the users and transmits, to the HPC operation managing server 200, job input requests including the generated job information. The job information includes status information such as the name of an application program to be used for the jobs.

The managing server 100 is a computer that supports the management of power consumption of the HPC system 30, while the power consumption of the HPC system 30 is managed by the HPC operation managing server 200. The managing server 100 acquires, from the HPC operation managing server 200, time-series power data indicating time-series changes in power consumed by jobs being executed and by jobs that has finished being executed. The managing server 100 estimates, based on the time-series power data acquired from the HPC operation managing server 200, time-series changes in power to be consumed by the jobs being executed. Then, the managing server 100 transmits, to the HPC operation managing server 200, results of estimating the time-series changes in power to be consumed by the jobs being executed.

Figure 4:
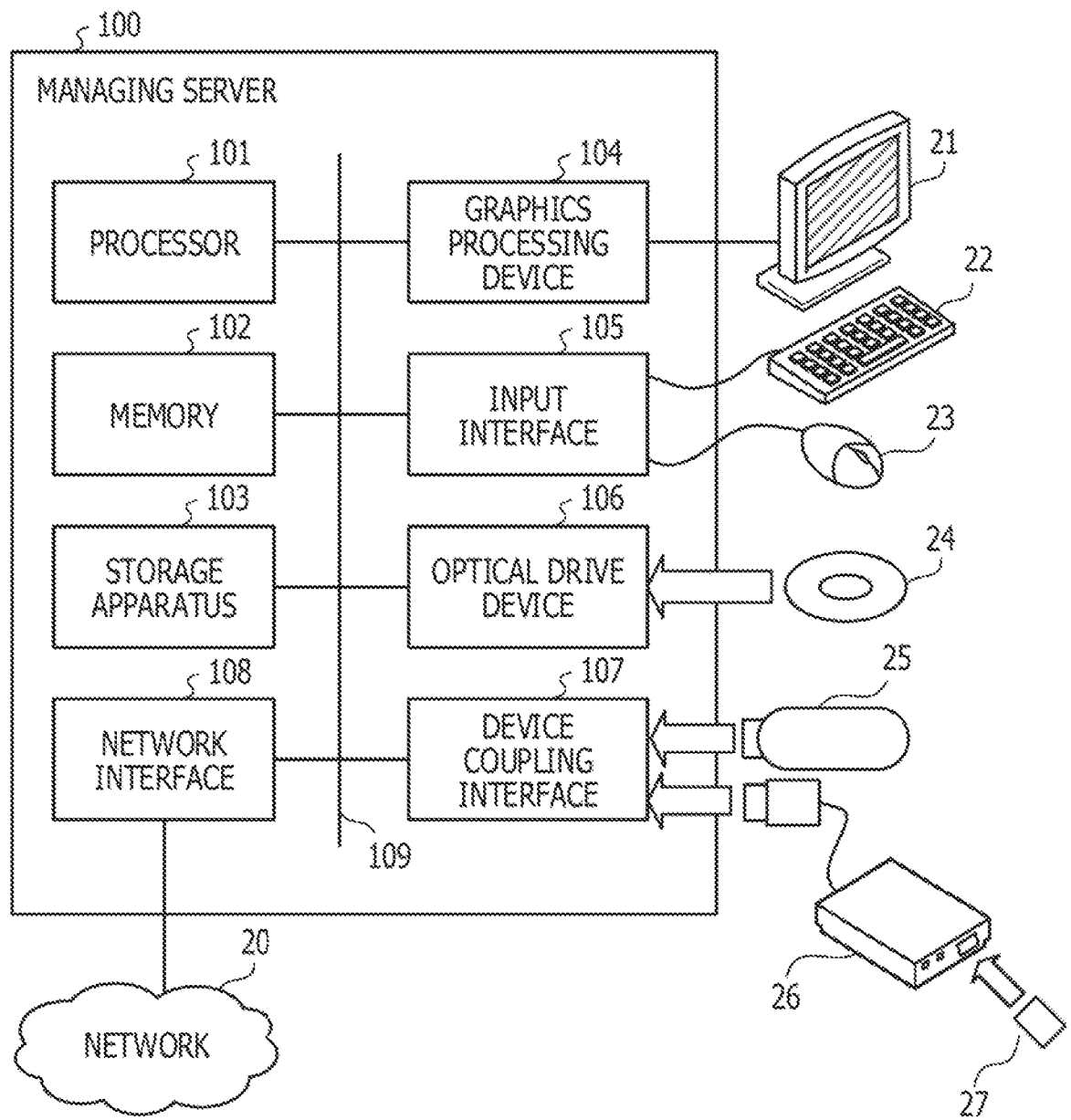
FIG. 4 is a diagram illustrating an example of a hardware configuration of a managing server.

FIG. 4 is a diagram illustrating an example of a hardware configuration of the managing server. The managing server 100 is entirely controlled by a processor 101. The processor 101 is coupled to a memory 102 and a plurality of peripheral devices via a bus 109. The processor 101 may be a multi-processor. The processor 101 is, for example, a central processing unit (CPU), a microprocessor unit (MPU), or a digital signal processor (DSP). Some or all of functions that are realized by causing the processor 101 to execute a program may be realized by electronic circuitry, such as an application-specific integrated circuit (ASIC) or a programmable logic device (PLD).

The memory 102 is used as a main storage device of the managing server 100. In the memory 102, a portion or all of an operating system (OS) program to be executed by the processor 101 and an application program are temporarily stored. In the memory 102, various data to be used for a process by the processor 101 is stored. As the memory 102, a volatile semiconductor storage device, such as a random-access memory (RAM), is used, for example.

As the peripheral devices coupled to the bus 109, there are a storage device 103, a graphics processing device 104, an input interface 105, an optical drive device 106, a device coupling interface 107, and a network interface 108.

The storage device 103 electrically or magnetically writes and reads data to and from an in-built recording medium. The storage device 103 is used as an auxiliary storage device of the computer. In the storage device 103, the OS program, the application program, and various data are stored. As the storage device 103, for example, a hard disk drive (HDD) or a solid state drive (SSD) may be used.

The graphics processing device 104 is coupled to a monitor 21. The graphics processing device 104 displays an image on a screen of the monitor 21 in accordance with a command from the processor 101. As the monitor 21, there is an organic electroluminescence (EL) display device, a liquid crystal display device, or the like.

The input interface 105 is coupled to a keyboard 22 and a mouse 23. The input interface 105 transmits, to the processor 101, signals transmitted from the keyboard 22 and the mouse 23. The mouse 23 is an example of a pointing device. Another pointing device may be used. As the other pointing device, there is a touch panel, a tablet, a touch pad, a trackball, or the like.

The optical drive device 106 uses laser light or the like to read data recorded in an optical disc 24. The optical disc 24 is a portable recording medium in which data is recorded so that the data is readable by light reflection. As the optical disc 24, there is a digital versatile disc (DVD), a DVD-RAM, a compact disc read-only memory (CD-ROM), a CD-recordable (R), a CD-rewritable (RW), or the like.

The device coupling interface 107 is a communication interface for coupling the peripheral devices to the managing server 100. For example, the device coupling interface 107 is coupled to a memory device 25 and a memory reader writer 26. The memory device 25 is a recording medium having a function of communicating with the device coupling interface 107. The memory reader writer 26 is a device that writes data to a memory card 27 or reads data from the memory card 27. The memory card 27 is a card-type recording medium.

The network interface 108 is coupled to the network 20. The network interface 108 transmits and receives data to and from another computer or another communication device via the network 20.

The managing server 100 may realize processing functions according to the second embodiment by means of the foregoing hardware configuration. Each of the HPC operation managing server 200 and the calculation nodes 31, 32, . . . may be also realized by the same hardware as the managing server 100 illustrated in FIG. 4. The job power estimating device 10 described in the first embodiment may be also realized by the same hardware as the managing server 100 illustrated in FIG. 4.

The managing server 100 realizes the processing functions according to the second embodiment by executing a program stored in, for example, a computer-readable recording medium. The program that describes details of processes to be executed by the managing server 100 may be recorded in various recording media. For example, the program to be executed by the managing server 100 may be stored in the storage device 103. The processor 101 loads a portion or all of the program stored in the storage device 103 into the memory 102 and executes the program. The program to be executed by the managing server 100 may be recorded in a portable recording medium, such as the optical disc 24, the memory device 25, or the memory card 27. After the program stored in the portable recording medium is installed in the storage device 103 under control by, for example, the processor 101, the program is able to be executed. The processor 101 is able to directly read the program from the portable recording medium and execute the program.

In the system illustrated in FIG. 3, the HPC operation managing server 200 and the managing server 100 collaborate with each other and appropriately manage power based on results of estimating power to be consumed in units of jobs. For example, the managing server 100 estimates time-series changes in power to be consumed by jobs being executed, based on measured values of power consumed by the jobs until the current time. The time-series changes in power to be consumed are represented by, for example, a power waveform. The HPC operation managing server 200 controls the execution of the jobs based on estimated values of time-series changes in power to be consumed by all the jobs being executed so that the maximum consumption power of the HPC system 30 is suppressed to a low level. For example, when the HPC operation managing server 200 estimates that the maximum consumption power of the HPC system 30 exceeds a threshold, the HPC operation managing server 200 stops the execution of one or more jobs.

To appropriately manage power in the foregoing manner, it is important to estimate power to be consumed by the jobs with high accuracy. Estimation models learned by, for example, an RNN may be used to estimate power to be consumed by the jobs.

Figure 5:
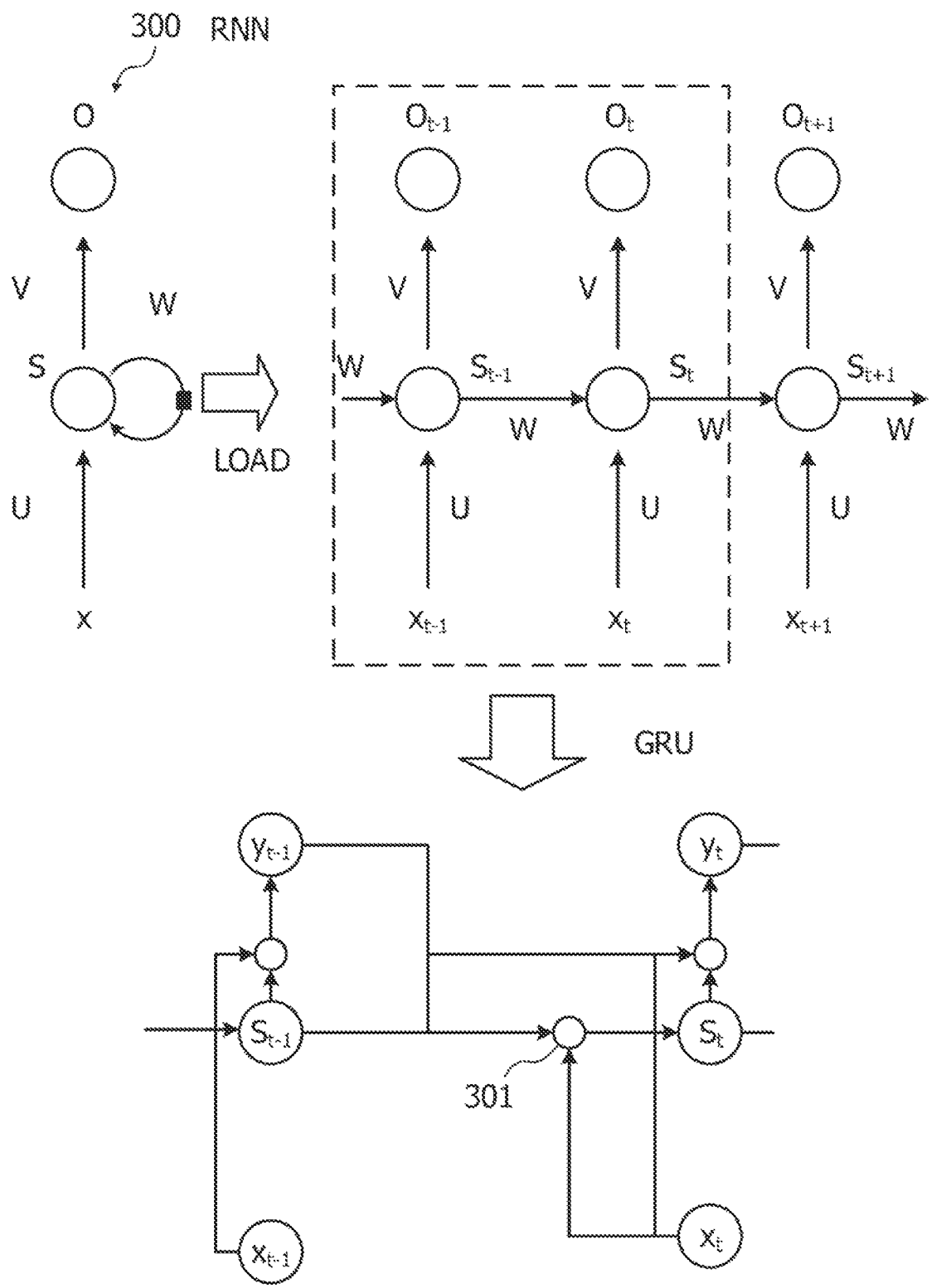
FIG. 5 is a diagram describing an RNN.

FIG. 5 is a diagram describing the RNN. An RNN 300 is a type of neural network and is used to learn time-series data. In the RNN, details of hidden layers at a time t are used as input at a next time t+1. As the RNN 300, there is a long short-term memory network (LSTM) or a gated recurrent unit (GRU).

The LSTM may store distant past information since a gating mechanism is implemented in the LSTM. Therefore, the LSTM is effective for a question that is not able to be estimated without reference to past information. The GRU is an improvement on the LSTM. The GRU is formed by simplifying the structure of the LSTM and has a single update gate 301 obtained by combining a forget gate and an input gate.

In the update gate 301, how far in the past information is used may be set. In the RNN 300, how far in the past information is used is set as a delay time. The delay time is a hyper parameter for determining whether learning and estimation are executed using information indicating how far in the past information with respect to a measurement time point for the estimation is used.

When a time-series change in power to be consumed by a job is to be estimated by the RNN 300, an estimation model may be generated using a result of measuring power consumed by a job that has already finished being executed.

FIG. 6 is a diagram illustrating an example of time-series power information of jobs. For each of jobs that have completed being executed, power (indicated by "x" in FIG. 6) consumed for each of time periods elapsed after the start of the execution of the job is set in time-series power information 302 of jobs. In the example illustrated in FIG. 6, power consumed by the jobs is measured at each of time points at intervals of 5 minutes, a time period of 5 minutes is used as the minimum unit, and the elapsed time periods are indicated by numbers (in ascending order from 0) of measurement time points.

The maximum value among execution times of the jobs is determined by a user-specified parameter. In the example illustrated in FIG. 6, the maximum value able to be set by a user is 24 hours (1440 minutes). Since values set in the time-series power information 302 are power values at time points at intervals of 5 minutes, the maximum value among the numbers of the measurement time points of power is "287". In the example illustrated in FIG. 6, the number of jobs for which time-series changes in power to be consumed are set in the time-series power information 302 is "1000". The maximum value among the execution times of the jobs and the number of jobs to be used to generate the time-series power information 302 are not limited to the numbers illustrated in FIG. 6.

Power to be consumed by jobs being executed may be estimated by causing the RNN 300 to learn power consumed by the jobs and generating estimation models based on the time-series power information 302 illustrated in FIG. 6. However, in a large system such as an HPC system, various jobs are executed and execution times of the jobs vary. For example, in the example illustrated in FIG. 6, most of jobs finish being executed before the measurement of power consumed at the 288th measurement time point, and there are only some jobs that have consumed power measured at all the 288 measurement time points.

Jobs whose execution times are largely different from each other have different patterns of time-series changes in power consumed. Therefore, even when patterns of time-series changes in power consumed are simply learned using time-series data of power consumed by jobs executed in the past, an appropriately estimation model may not be generated.

Figure 7:
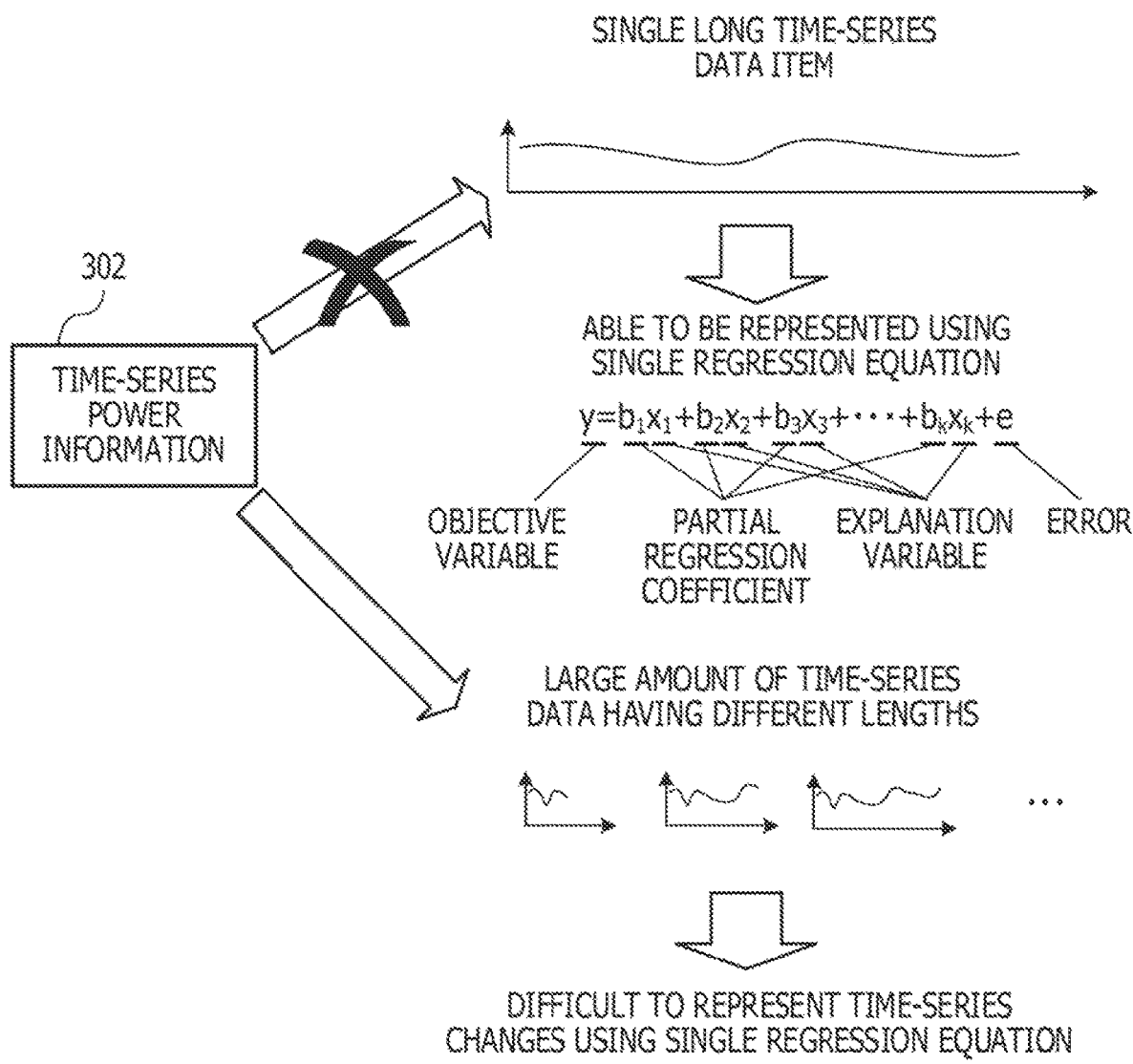
FIG. 7 is a diagram illustrating characteristics of time-series data indicating a time-series change in power consumed by each job.

FIG. 7 is a diagram illustrating characteristics of time-series data indicating a time-series change in power consumed by each job. When the time-series power information 302 of all the jobs is represented by a single long time-series data item, time-series changes in power consumed are able to be represented by a single regression equation. The regression equation is an equation for calculating an objective variable using a partial regression coefficient, an explanation variable, and an error. However, execution times of jobs executed by the HPC system or the like vary and the time-series power information 302 of all the jobs is a large amount of time-series data having different lengths. The time-series data of the jobs has not only different lengths but also different characteristics. In this case, it is difficult to use a single regression equation to represent time-series changes in power consumed by the jobs.

FIG. 7 indicates whether the time-series changes in power consumed are represented by a single regression equation, but the same consideration may be applied to estimation models of the RNN. For example, it is difficult to use a single estimation model to represent the time-series power information 302 of all the jobs. The managing server 100 classifies the time-series power information 302 of all the jobs based on the lengths of the data and generates estimation models for respective groups of time-series data having lengths nearly equal to or equal to each other. Therefore, estimation models for which a common characteristic is reflected in time-series data having lengths equal to or nearly equal to each other may be generated.

The managing server 100 may not only improve the accuracy of the estimation of power to be consumed but also reduce a process load to be applied due to the generation of the estimation models. A method of generating a data set that enables an improvement in the accuracy of the estimation of power to be consumed and a reduction in the process load is described below with reference to FIGS. 8 to 10.

Figure 8:
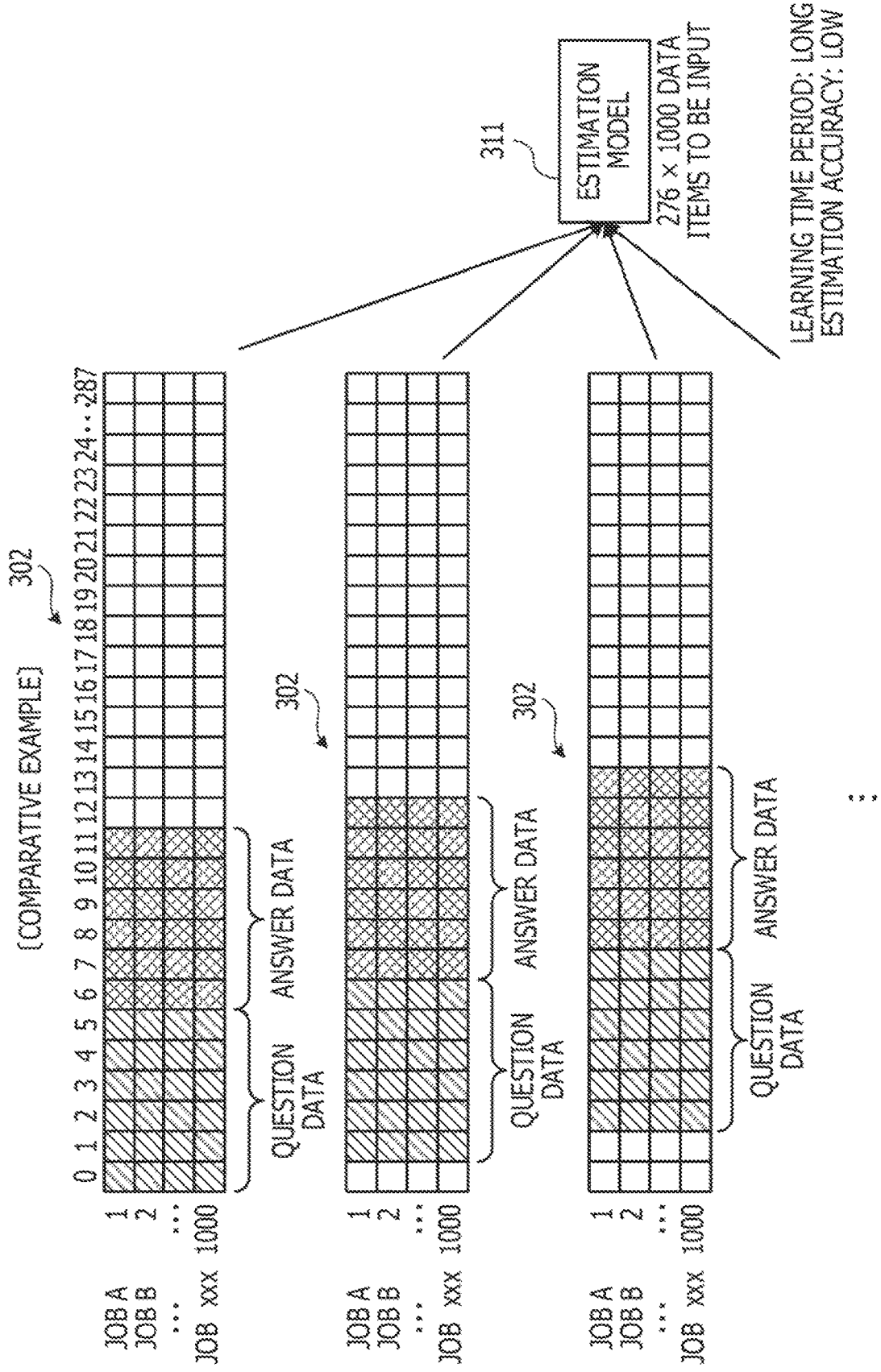
FIG. 8 is a diagram illustrating a comparative example of data sets for learning.

FIG. 8 is a diagram illustrating a comparative example of data sets for learning. FIG. 8 illustrates an example in which a single estimation model 311 is generated from the time-series power information 302 including the time-series power data of all the jobs. In the example illustrated in FIG. 8, a combination of question data that is time-series power data for a certain time period of 30 minutes and answer data that is time-series power data for a time period of 30 minutes immediately after the certain time period is a data set for learning. A plurality of data sets for learning are generated from the time-series power information 302, while time zones for extraction of question data and answer data are shifted from each other by 5 minutes.

When the estimation model 311 is generated by the RNN using such data sets, a large amount of data sets are generated and thus it takes time to execute learning. For example, when the number of jobs of which power values have been measured is "1000", the managing server 100 repeatedly inputs, to the estimation model 311, 1000 time-series power data items 276 times while shifting a range of question data and answer data, thereby learning the estimation model 311. In the comparative example illustrated in FIG. 8, the single estimation model 311 is learned using various data sets, and thus the RNN may not be appropriately learned and the accuracy of estimation by the generated estimation model 311 is low.

In this case, reducing the number of data sets for learning is effective to reduce a time period for the learning.

Figure 9:
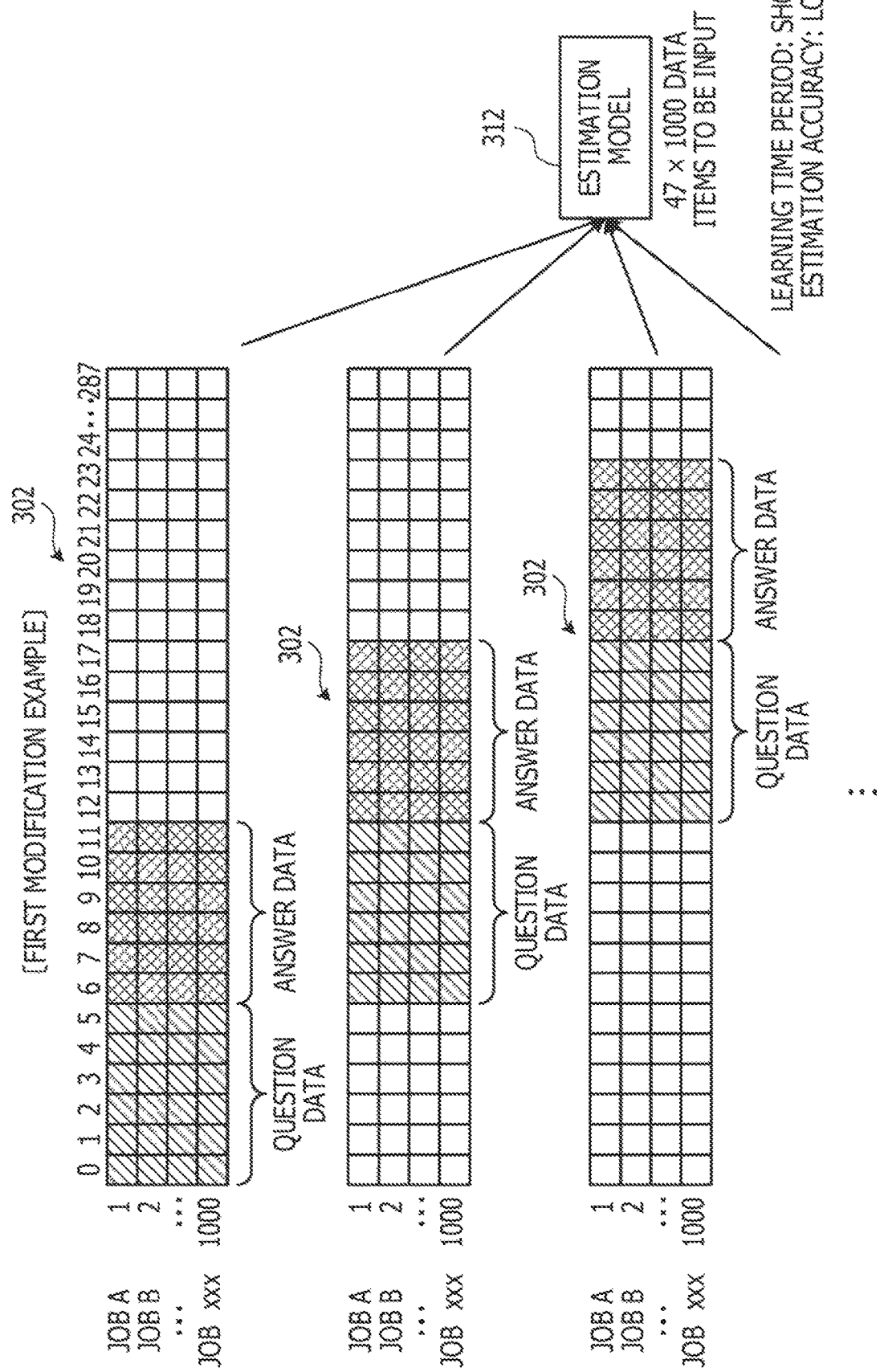
FIG. 9 is a diagram illustrating a first modification example of data sets for learning.

FIG. 9 is a diagram illustrating a first modification example of data sets for learning. In the example illustrated in FIG. 9, data sets for learning for time periods shifted from each other by 30 minutes are generated from the time-series power information 302 including the time-series power data of all the jobs. This may reduce the number of data sets. For example, when the number of jobs of which power values have been measured is "1000", the managing server 100 repeatedly inputs, to an estimation model 312, 1000 time-series power data items 47 times while shifting a range of question data and answer data, thereby learning the estimation model 312. As a result, a time period for generating the estimation model 312 is reduced for the reduction in the number of data sets. However, learning the single estimation model 312 using various data sets is the same as the comparative example illustrated in FIG. 8, and the accuracy of estimation by the generated estimation model 312 is low, like the comparative example.

Therefore, the managing server 100 reduces a variation in data sets by generating models for respective time periods (estimation periods) of a time period elapsed after the start of the execution of jobs.

Figure 10:
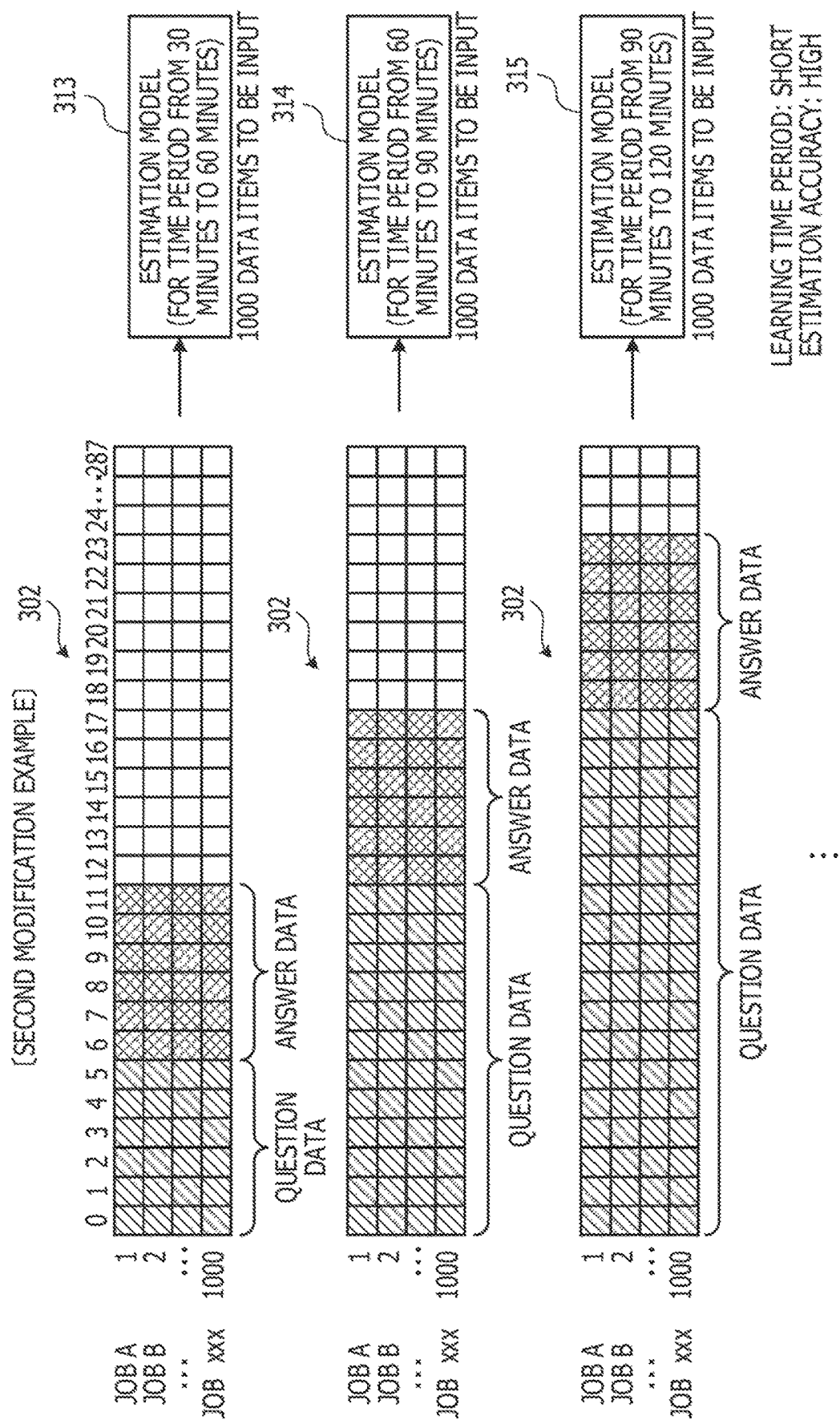
FIG. 10 is a diagram illustrating a second modification example of data sets for learning.

FIG. 10 is a diagram illustrating a second modification example of data sets for learning. In the example illustrated in FIG. 10, the time period elapsed after the start of the execution of the jobs is divided into a plurality of time zones, and estimation models 313 to 315 are generated for the respective time zones of the elapsed time period. In each of data sets for learning of the estimation models 313 to 315, power for a time period before a corresponding time zone is indicated by question data, and power for the corresponding time zone is indicated by answer data.

For example, the managing server 100 divides the time period elapsed after the start of the execution of the jobs into time zones of 30 minutes. Then, the managing server 100 generates data sets for the respective time zones of 30 minutes. For example, when the number of jobs of which power values have been measured is "1000", the managing server 100 inputs 1000 time-series power data items to each of estimation models 313, 314, 315, . . . , thereby learning each of the estimation models 313, 314, 315, . . . .

For example, the managing server 100 extracts, from the time-series power information 302, power (numbers "0" to "5" of measurement time points) consumed by the jobs for the time zone from 0 minutes to 30 minutes elapsed after the start of the execution as question data. Then, the managing server 100 extracts, from the time-series power information 302, power (numbers "6" to "11" of measurement time points) consumed by the jobs for the time zone from 30 minutes to 60 minutes elapsed after the start of the execution as answer data. Then, the managing server 100 treats a combination of the extracted question data and the extracted answer data as a data set for generation of the estimation model 313 for estimating power to be consumed for the time zone from 30 minutes to 60 minutes.

The managing server 100 extracts, from the time-series power information 302, power (numbers "0" to "11" of measurement time points) consumed by the jobs for the time zone from 0 minutes to 60 minutes elapsed after the start of the execution as question data. Then, the managing server 100 extracts, from the time-series power information 302, power (numbers "12" to "17" of measurement time points) consumed by the jobs for the time zone from 60 minutes to 90 minutes elapsed after the start of the execution as answer data. Then, the managing server 100 treats a combination of the extracted question data and the extracted answer data as a data set for generation of the estimation model 314 for estimating power to be consumed for the time zone from 60 minutes to 90 minutes.

The managing server 100 extracts, from the time-series power information 302, power (numbers "0" to "17" of measurement time points) consumed by the jobs for the time zone from 0 minutes to 90 minutes elapsed after the start of the execution as question data. Then, the managing server 100 extracts, from the time-series power information 302, power (numbers "18" to "23" of measurement time points) consumed by the jobs for the time zone from 90 minutes to 120 minutes elapsed after the start of the execution as answer data. Then, the managing server 100 treats a combination of the extracted question data and the extracted answer data as a data set for generation of the estimation model 315 for estimating power to be consumed for the time zone from 90 minutes to 120 minutes.

In this manner, the managing server 100 divides the time period elapsed after the start of the execution of the jobs into the time zones and generates the estimation models 313, 314, 315, . . . for the respective time zones. To generate the estimation models 313, 314, 315, . . . , time-series changes in power consumed by the jobs for all the time periods before the respective estimation periods are used as question data. For example, data to be extracted from time-series power data of a single job as data to be input to a single estimation model is in only one range, and thus a variation in data sets is reduced. As described above, since data sets are limited to data appropriate to estimate power to be consumed for the estimation periods, it is possible to correctly learn the trend of power to be consumed for the estimation periods. As a result, the accuracy of the estimation is improved. By setting the lengths of the estimation periods to approximately 30 minutes, the number of data sets may be reduced, and a time period for the learning is short.

Differences between calculation amounts and the estimation accuracy in the comparative example and the first and second modification examples are described below.

FIG. 11 is a diagram illustrating a learning model generation example comparison table. The learning model generation example comparison table 321 indicates results of comparing processes of generating a learning model in the comparative example, the first modification example, and the second modification example, which are illustrated in FIGS. 8 to 10. Items to be compared are data set amounts, RNN sizes, calculation amounts for learning, and estimation accuracy. In the example illustrated in FIG. 11, the number of jobs from which time-series power data has been acquired is "1000", and the time-series power data includes results of measuring power values at 288 time points (for one day) at time intervals of 5 minutes.

The learning model generation example comparison table 321 indicates, as the data set amounts, the total number of data set power values, the number of models, and the number of data set power values per estimation model.

The total number of data set power values is the total number of power values included in a data set to be used to generate an estimation model. In the comparative example, the total number of power values to be input as question data is "6×276×1000". In the comparative example, the total number of power values indicating answer data to output of learning results is "6×276×1000". In the first modification example, the total number of power values to be input as question data is "6×47×1000". In the first modification example, the total number of power values indicating answer data to output of learning results is "6×47×1000". In the second modification example, the total number of power values to be input as question data is "Σ6N×1000" (N is an integer in a range of 1 to 47) (Σ is a sign indicating summation). In the second modification example, the total number of power values indicating answer data to output of learning results is "6×47×1000".

The number of models is the number of estimation models to be generated. In the comparative example, a single estimation model is generated. In the first modification example, a single model is generated. In the second modification example, 47 estimation models are generated.

The number of data set power values per estimation model s the number of power values in a data set to be used to generate a single estimation model. In the comparative example and the first modification example, the number of data set power values per estimation model is equal to the total number of data set power values. In the second modification example, the numbers of power values in data sets to be used for the estimation models vary. When the estimation models generated in the second modification example are arranged in ascending order of time period from the start of the execution of the jobs to the end of an estimation period, and numbers of 1 to N are assigned to the arranged estimation models, the number of power values to be input as question data to the N-th estimation model is "6N×1000". In the second modification example, the number of power values indicating answer data to output of results of learning each of the estimation models is "6×1000".

The learning model generation example comparison table 321 indicates, as the RNN sizes, input and output numbers and input/output.

The input and output numbers indicate the number of power values to be input to an input layer of the RNN and the number of power values to be output from an output layer of the RNN. In the comparative example and the first modification example, the number of power values to be input is "6" and the number of power values to be output is "6". In the second modification example, the number of power values to be input to the N-th estimation model is "6N" and the number of power values to be output is "6".

The input/output indicates the value of the ratio of the number of power values to be input to the input layer of the RNN to the number of power values to be output from the output layer of the RNN. In the comparative example and the first modification example, the input/output is "1". In the second modification example, the input/output of the N-th estimation model is "N".

The learning model generation example comparison table 321 indicates, as calculation amounts for the learning per estimation model, the minimum calculation amount and the maximum calculation amount using a calculation amount (the minimum and maximum calculation amounts are "1") for the learning of a single estimation model in the first modification example as a reference unit. The minimum and maximum calculation amounts in the comparative example are "6" (six times as large as the calculation amount in the first modification example). The calculation amount in the second modification example is at the minimum level when the first estimation model for which the number of power values to be input is the minimum value of "6" is generated. The minimum calculation amount in the second modification example is "1/47" (1/47 of the calculation amount in the first modification example). The calculation amount in the second modification example is at the maximum level when the N-th estimation model for which the number of power values to be input is the maximum value of "6N" is generated. The maximum calculation amount in the second modification example is "47" (47 times as large as the calculation amount in the first modification example).

The estimation accuracy indicated in the learning model generation example comparison table 321 is averages (%) of relative errors of power values estimated based on the generated estimation models with respect to power values obtained by measuring power. Each of the relative errors is obtained by dividing an absolute error (difference between an estimated value and a measured value) by the measured value. As the estimation accuracy, experimental results in the comparative example and the second modification example are indicated. While the relative error in the comparative example is "65", the relative error in the second modification example is "8.8".

In the second modification example, a calculation amount is small for a certain generated estimation model and a calculation amount is large for another generated estimation model. When the calculation amount is large, a time period elapsed from the start of the execution of a job to the end of an estimation period is long. In fact, many jobs finish being executed within time periods shorter than the maximum value (one day (24 hours) in the example illustrated in FIG. 11) among the execution times, and the number of jobs executed for long time periods up to times when the jobs finish being executed is small.

Figure 12:
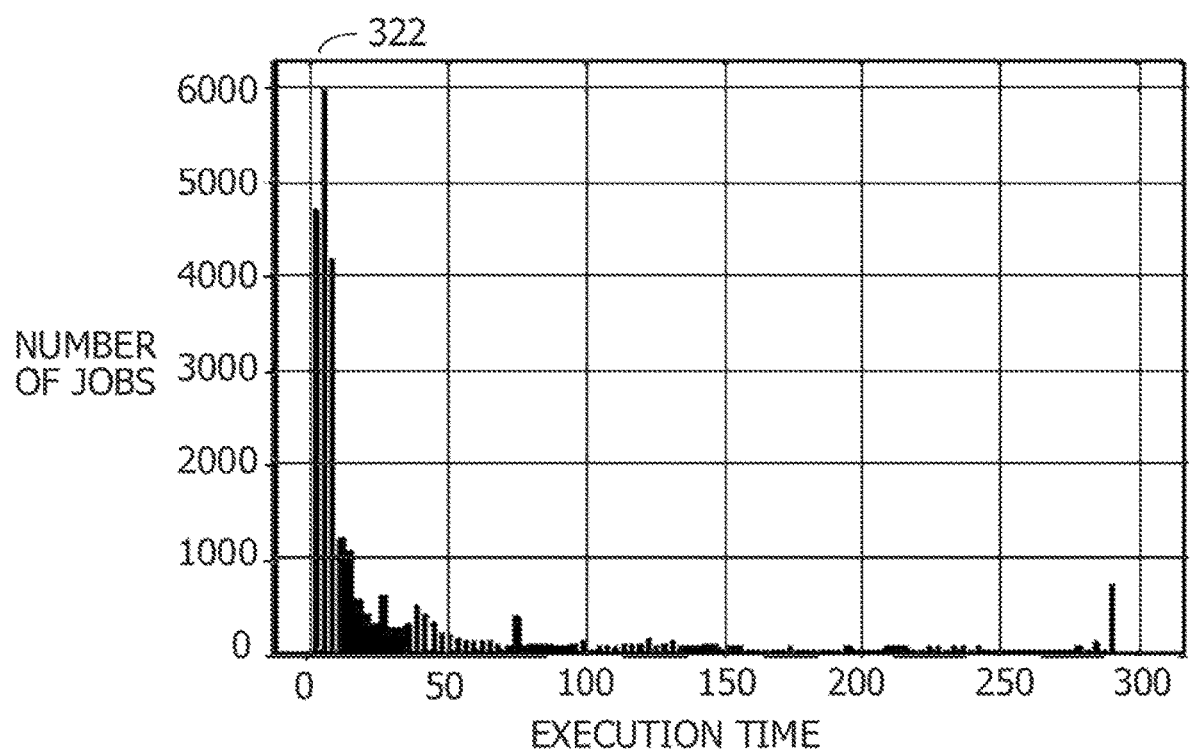
FIG. 12 is a diagram illustrating an example of a distribution of execution times of jobs up to times when the jobs finish being executed.

FIG. 12 is a diagram illustrating an example of a distribution of execution times of jobs up to times when the jobs finish being executed. FIG. 12 indicates an execution time distribution table 322 of the jobs. In the execution time distribution table 322 of the jobs, an abscissa indicates an time period (execution time) from the start of the execution of jobs to the end of the execution of the jobs using 5 minutes as unit time periods (5 times as large as numbers of the execution times indicate the execution times in minutes). An ordinate indicates the number of jobs that have finished being executed in each of a plurality of time periods of a predetermined length that are obtained by dividing an entire execution time. As illustrated in FIG. 12, execution times of most of the jobs are short. Therefore, as an estimation period for which an estimation model is used is later, the amount of power values of actual measurement results included in a data set decreases and a time period for calculation decreases.

In the example illustrated in FIG. 11, the relative error in the second modification example is much smaller than that in the comparative example. The relative error in the second modification example that is illustrated in FIG. 11 is the average of relative errors of the plurality of generated estimation models. However, as time periods for which question data is to be acquired are longer (the numbers of power values to be input are larger), the relative errors of the estimation models decrease.

Figure 13:
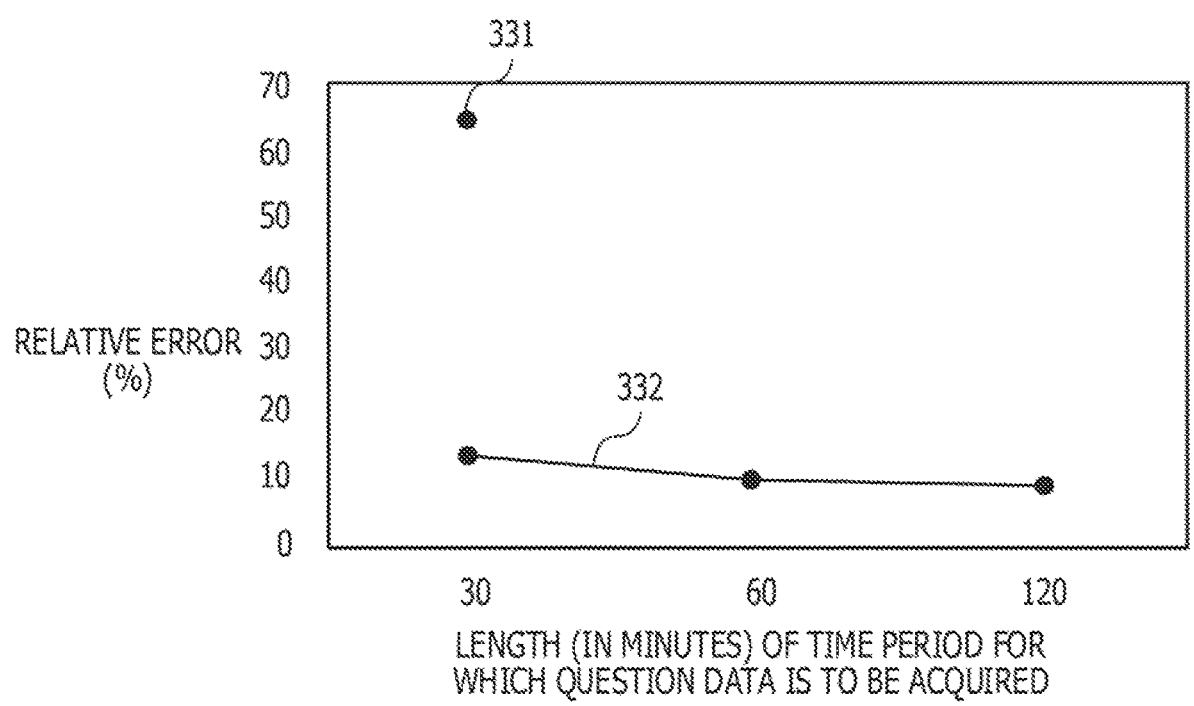
FIG. 13 is a diagram illustrating relationships between lengths of time periods for which question data is to be acquired and relative errors.

FIG. 13 is a diagram illustrating relationships between lengths of time periods for which question data is to be acquired and relative errors. FIG. 13 illustrates a relative error 331 in a first comparative example and a relative error 332 in the second modification example in a graph. The relative error 332 in the second modification example is indicated by a line graph corresponding to the lengths of the time periods for which the question data is to be acquired.

As illustrated in FIG. 13, as a time period for which question data is to be acquired is longer, the relative error 332 in the second modification example decreases. Even when each of time periods for which question data is to be acquired is 30 minutes (the number of power values to be input is "6"), the relative error 332 in the second modification example is significantly smaller than the relative error 331 in the first comparative example. For example, even when time periods for which question data is to be acquired are equal to or nearly equal to each other, the estimation is able to be executed in the second modification example with higher accuracy than the comparative example.

This indicates that, of two large differences (difference between the RNN sizes (the numbers of power values to be input) and difference between variations in data sets) between the second modification example and the comparative example, a difference between variations in data sets largely contributes to the estimation accuracy. For example, a variation in data sets to be used to generate a single estimation model in the second modification example is lower than that in the comparative example. The lower variation results in an improvement in the estimation accuracy.

A method of managing power consumption of the HPC system 30 via job power estimation by the managing server 100 is described below in detail. In the following example, the managing server 100 further reduces amounts of data sets, compared to the second modification example illustrated in FIG. 10 (refer to FIGS. 20 to 23 for more detail).

Figure 14:
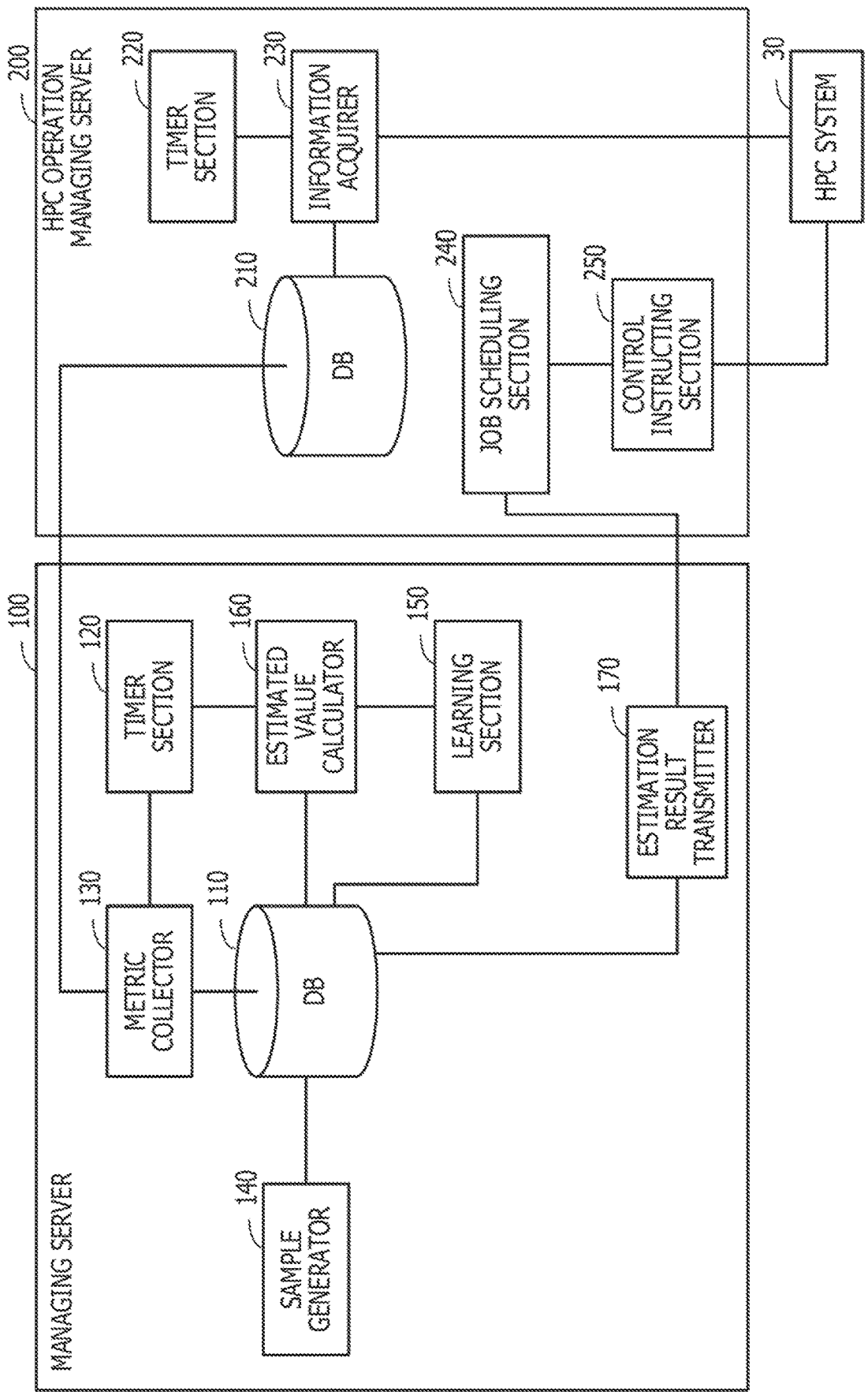
FIG. 14 is a block diagram illustrating functions of devices for power management.

FIG. 14 is a block diagram illustrating functions of the devices for power management. The HPC operation managing server 200 includes a DB 210, a timer section 220, an information acquirer 230, a job scheduling section 240, and a control instructing section 250.

The DB 210 stores job status information indicating statuses of jobs executed and to be executed, and job consumed power information indicating time-series changes in power consumed by the jobs executed.

The timer section 220 manages the timing of collecting the consumed power information for each of the jobs from the HPC system 30. For example, the timer section 220 instructs the information acquirer 230 to collect the job consumed power information at fixed time intervals.

The information acquirer 230 acquires, from the HPC system 30 in accordance with the instruction from the timer section 220, time-series power data of jobs that have finished being executed in the HPC system 30. The information acquirer 230 causes the acquired consumed power information to be stored in the DB 210.

The HPC system 30 includes a function of measuring power for each of jobs. For example, each of the calculation nodes 31, 32, . . . included in the HPC system 30 includes a device for measuring consumed power and may treat, as power consumed by each of the jobs, a difference between power consumed in a state in which the job is not executed and power consumed in a state in which the job is executed. Each of the calculation nodes 31, 32, . . . may measure power consumed by a job based on information of a temperature sensor or the like. For example, each of the calculation nodes 31, 32, . . . causes the temperature sensor to collect the temperature of a CPU and the temperature of air discharged from a system board (SB). Each of the calculation nodes 31, 32, . . . calculates a change ($T_{cpu}$) in the temperature of the CPU and a change ($T_{air}$) in the temperature of the air discharged from the SB based on the collected temperature data.

The change ($T_{cpu}$) in the temperature of the CPU may be calculated according to the following equation. The change ($T_{cpu}$) in the temperature of the CPU=the temperature of the CPU− the temperature of input cooling water . . . (1)

The change ($T_{air}$) in the temperature of the air discharged from the SB may be calculated according to the following equation. The change ($T_{air}$) in the temperature of the air discharged from the SB=the temperature of the air discharged from the SB− the temperature of air drawn into a rack . . . (2)

Each of the calculation nodes 31, 32, . . . calculates power consumed by the CPU from the change in the temperature of the CPU (for example, the power consumed by the CPU=$1.02 \cdot T_{cpu}$). Each of the calculation nodes 31, 32, . . . calculates power consumed by a memory from the temperature of the air discharged from the SB (for example, the power consumed by the memory=$0.254 \cdot T_{air}$). Each of the calculation nodes 31, 32, . . . treats power consumed by an interconnect controller (ICC) as a fixed value (for example, the power consumed by the ICC=8.36). Each of the calculation nodes 31, 32, . . . estimates power P to be consumed by a job according to the following equation. $P=1.02 \cdot T_{cpu}+0.254 \cdot T_{air}+8.36$ . . . (3)

The job scheduling section 240 generates an execution schedule of a newly input job. Upon receiving, from the managing server 100, a result of estimating power to be consumed by a job being executed, the job scheduling section 240 determines whether power to be consumed by the HPC system 30 exceeds a predetermined threshold. For example, the job scheduling section 240 treats the total of power to be consumed by jobs being executed as the power to be consumed by the HPC system 30. When the job scheduling section 240 estimates that the power to be consumed by the HPC system 30 exceeds the threshold, the job scheduling section 240 determines that one or more of the jobs is to be forcibly stopped.

The control instructing section 250 instructs the HPC system 30 to execute a job in accordance with an execution schedule, generated by the job scheduling section 240, of the job. When the job scheduling section 240 determines that a job is forcibly to be stopped, the control instructing section 250 instructs the HPC system 30 to stop the job.

The managing server 100 includes a DB 110, a timer section 120, a metric collector 130, a sample generator 140, a learning section 150, an estimated value calculator 160, and an estimation result transmitter 170.

The DB 110 stores information to be used to estimate a pattern of power to be consumed by each of jobs. The timer section 120 manages the timing of acquiring time-series power data of a job already executed. For example, the timer section 120 instructs the metric collector 130 to collect information from the HPC operation managing server 200 at fixed time intervals. When a job starts being executed, the timer section 120 instructs the estimated value calculator 160 to estimate power to be consumed by the job at fixed time intervals.

The metric collector 130 collects the information from the HPC operation managing server 200 in accordance with the instruction from the timer section 120. For example, the metric collector 130 acquires, from the HPC operation managing server 200, job status information of a job waiting to be executed and a job that has finished being executed, and time-series power data indicating a pattern of power consumed by the job that has finished being executed. The metric collector 130 causes the acquired information to be stored in the DB 110.

The sample generator 140 generates sample data to be used to generate an estimation model for estimating power to be consumed, based on the time-series power data stored in the DB 110. For example, the sample generator 140 treats, as estimation periods, a plurality of time zones obtained by dividing a time period elapsed after the start of the execution of a job, and generates data sets for learning for the respective estimation periods. Then, the sample generator 140 causes a set of the generated data sets to be stored as sample data in the DB 110.

The learning section 150 uses a neural network to generate estimation models for estimating power to be consumed from past consumed power information of jobs. For example, the learning section 150 uses, for each of the estimation periods, a data set for the estimation period to generate an estimation model by means of the RNN.

At times instructed by the timer section 120, the estimated value calculator 160 uses the estimation models to estimate a time-series change in power to be consumed by the job being executed. For example, the estimated value calculator 160 uses an estimation model for a time period based on an execution time of a current job of a group to which a job targeted for estimation of power to be consumed to estimate power to be consumed belongs.

The estimation result transmitter 170 transmits, to the HPC operation managing server 200, a result of estimating power to be consumed by a job that is not executed and a result of estimating power to be consumed by a job being executed.

Lines that couple sections illustrated in FIG. 14 to each other indicate some of communication paths. A communication path other than the communication paths illustrated in FIG. 14 may be set. Functions of the sections illustrated in FIG. 14 may be enabled by, for example, causing the computers to execute program modules corresponding to the sections.

Figure 15:
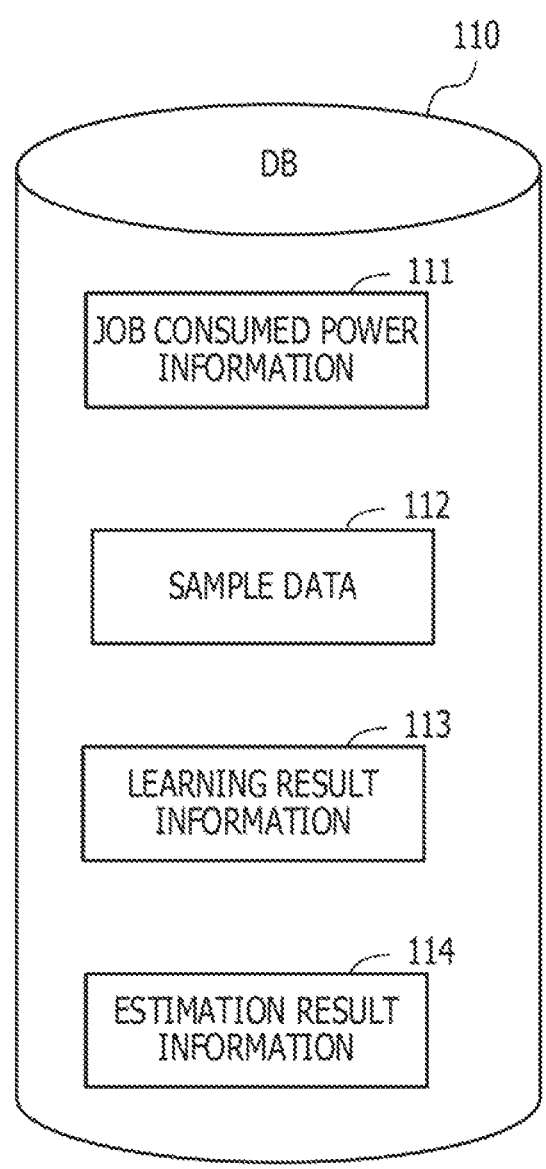
FIG. 15 is a diagram illustrating an example of information stored in a database (DB) of the managing server.

FIG. 15 is a diagram illustrating an example of information stored in the DB of the managing server. In the example illustrated in FIG. 15, job consumed power information 111, sample data 112, learning result information 113, and estimation result information 114 are stored in the DB 110.

The job consumed power information 111 is time-series information on power consumed by jobs that have finished being executed. The sample data 112 is time-series power data extracted from the job consumed power information 111 and to be used to generate the estimation models for the respective estimation periods. The learning result information 113 is information indicating results of learning the estimation models. The estimation result information 114 is information indicating results of estimating power to be consumed by jobs being executed for a predetermined subsequent time period.

FIG. 16 is a diagram illustrating an example of the job consumed power information. The job consumed power information 111 is, for example, a data table in which time periods elapsed after the start of the execution of jobs are set in row labels and job names are set in column labels. At positions where the rows and the columns intersect with each other, power consumed by the jobs indicated in columns at time points when the time periods indicated in rows elapse after the start of the execution of the jobs indicated in the columns is set. In the example illustrated in FIG. 16, numbers of measurement time points corresponding to the elapsed time periods are indicated for the elapsed time periods.

FIG. 17 is a diagram illustrating an example of the sample data. The sample data 112 includes a plurality of data sets 112a, 112b, . . . . For example, the sample generator 140 assigns identifiers "Interval 0", "Interval 1, "Interval 2", . . . to time periods obtained by dividing a time period elapsed after the start of the execution of jobs in the order from the earliest time period. In this case, since time-series power data before the time period of "Interval 0" does not exist, the "time period of "Interval 0" is excluded from the estimation periods. Therefore, the sample generator 140 sets the time periods "Interval 1" and later as the estimation periods. Then, the sample generator 140 generates the data sets 112a, 112b, . . . for the respective estimation periods.

For example, the data set 112a includes time-series power data to be used to generate an estimation model for the estimation period of "Interval 1". In the data set 112a, time-series power data of jobs already executed is set in association with combinations of job names of the jobs and job numbers of the jobs. In a time-series power data field, power values measured at measurement time points of power are set in association with numbers of the measurement time points.

The time-series power data included in the data set 112a is divided into question data and answer data. The question data includes power values measured before the estimation period indicated in the data set 112a. The answer data includes power values measured in the estimation period indicated in the data set 112a.

Similarly to the data set 112a, the other data sets 112b, . . . include time-series power data to be used to generate estimation models for the respective estimation periods.

Figure 18:
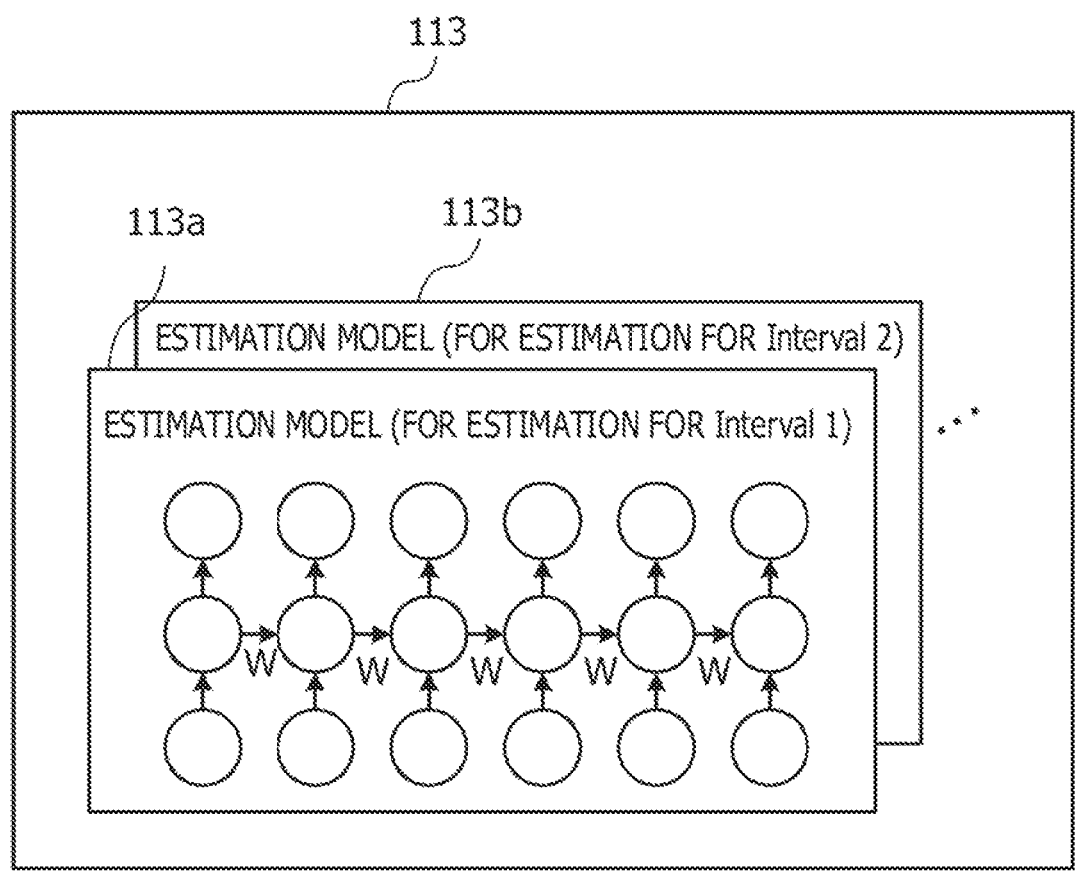
FIG. 18 is a diagram illustrating an example of learning result information.

FIG. 18 is a diagram illustrating an example of the learning result information. The learning result information 113 includes estimation models 113a, 113b, . . . for groups, for example. For example, the estimation model 113a is an estimation model of a neural network (for example, an RNN) for estimating power to be consumed at each of first (5 minutes later) to sixth measurement time points set at time intervals of unit periods (of 5 minutes). Learning in the neural network is to calculate appropriate values of weights for data input to units corresponding to neurons. In learning results, for example, the structure of the RNN and learned weight values are set.

Figure 19:
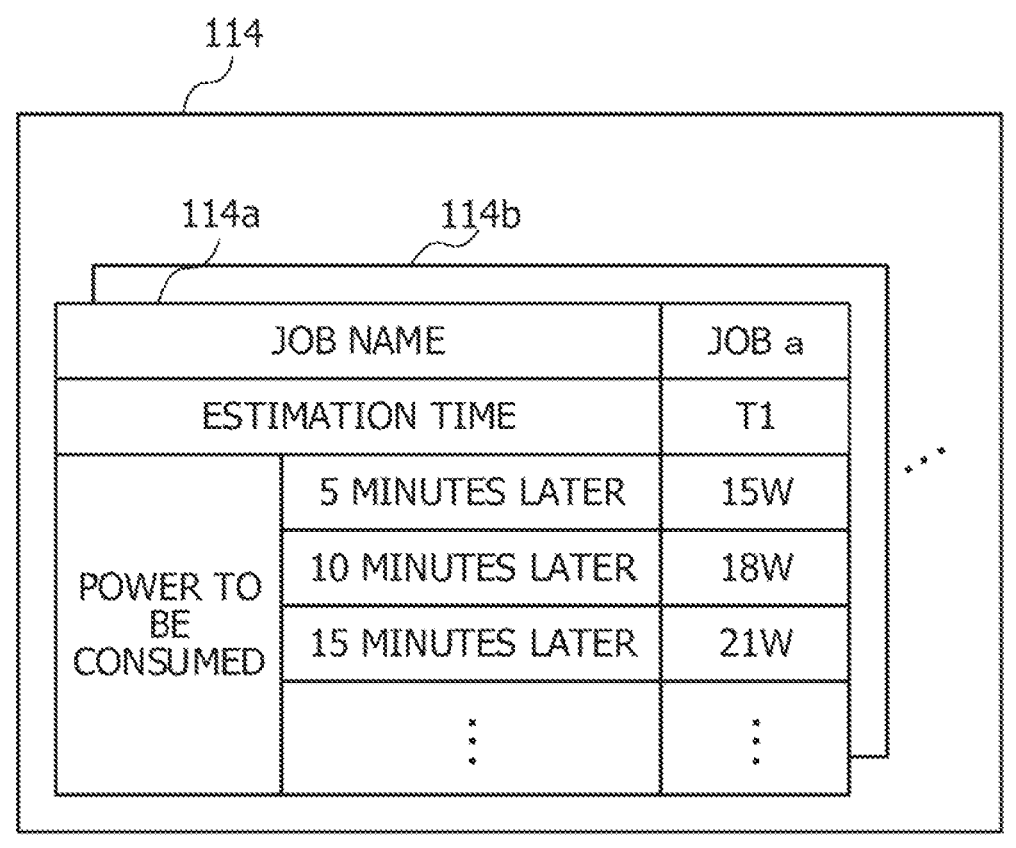

FIG. 19 is a diagram illustrating an example of the estimation result information. The estimation result information 114 includes estimated power data 114a, 114b, . . . of jobs being executed. In the estimated power data 114a, 114b, . . . , for example, job names, estimation times, and power to be consumed at the estimation times are set.

Next, a method of generating the data sets, included in the sample data 112, for the estimation periods is described in detail.

In the example illustrated in FIG. 10, the data sets to be used to generate the estimation models 313 to 315 are extracted from the time-series power information 302 of all the jobs. However, time-series power data of a job that finishes being executed before an estimation period may not be useful to generate an estimation model for the estimation period. For example, time-series power data of a job that finishes being executed in less than 30 minutes after the start of the execution of the job is not effective to generate an estimation model for estimating power for a time period from 120 minutes to 150 minutes elapsed after the start of the execution of the job. For example, the sample generator 140 may limit time-series power data to be used to generate an estimation model to time-series power data of a job that has continued to be executed until an estimation period for estimation by the concerned estimation model.

FIG. 20 is a diagram illustrating an example (reference example) of the generation of a data set. In the example illustrated in FIG. 20, a data set 333 corresponding to the estimation period of "Interval 2" is generated based on the job consumed power information 111.

When power values measured at measurement time points when each of the jobs is being executed are not "0", "x" is indicated in cells for the corresponding measurement time points in the job consumed power information 111 illustrated in FIG. 20. In the job consumed power information 111, "0" is indicated in cells for measurement time points after the end of the execution of each of the jobs.

As is understood from FIG. 20, lengths of execution times vary for the jobs. Therefore, in the case where time-series power data to be used to generate an estimation model is limited to time-series power data of a job that has continued to be executed until an estimation period for estimation by the estimation model, as a time period from the start of the execution of the job to the end of the estimation period is longer, the number of power values included in the data set is smaller.

For example, the data set 333 for the estimation period of "Interval 2" may be generated in the following procedure.

In the example illustrated in FIG. 20, jobs "JOB A", "JOB B", "JOB C", "JOB D", and "JOB E" finish being executed before the start of the estimation period of "Interval 2". These jobs are not executed in the estimation period of "Interval 2", and it may be considered that time-series power data of the jobs is not so effective to estimate power to be consumed by jobs that are continuously executed during the estimation period of "Interval 2". Therefore, the sample generator 140 is able to exclude measured values of power consumed by the jobs from the data set 333 for the generation of the estimation model for the estimation period of "Interval 2".

However, among the jobs executed, a job that is completed (after a measurement time point "11" and before a measurement time point "12") immediately after the start of the estimation period of "Interval 2" exists, like a job "JOB F". To correctly estimate power to be consumed by a job of the same type as the job "JOB F", it is desirable that a large amount of time-series power data of jobs that have finished being executed in time periods equal to or nearly equal to the execution time of the job "JOB F" be included in the data set 333. However, in the example illustrated in FIG. 20, the amount of time-series power data of jobs that have finished being executed within the estimation period of "Interval 2" is small. It is, therefore, difficult for an estimation model generated using the data set 333 to correctly estimate a time-series change in power to be consumed by a job that finishes being executed within the estimation period of "Interval 2" and whose consumed power changes to "0".

The sample generator 140 adds, to the data set, time-series power data of a job that has finished being executed within a predetermined time period before an estimation period. For example, the sample generator 140 causes time-series power data of jobs that have finished being executed at and after a measurement time point "6x–5" to be included in a data set to be used to estimate power to be consumed for an estimation period of "Interval x" (x is an integer of 1 or greater). Examples of the generation of data sets, each of which includes time-series power data of jobs that have finished being executed within a predetermined time period before an estimation period, are described below with reference to FIGS. 21 to 23.

FIG. 21 is a diagram illustrating a first example of the generation of a data set. In the example illustrated in FIG. 21, the data set 112a corresponding to the estimation period of "Interval 1" (x=1) is generated based on the job consumed power information 111. In this case, the sample generator 140 causes time-series power data of jobs that have finished being executed at and after a measurement time point "1" (6×1–5) to be included in the data set 112a. In the data set 112a, power values at measurement time points "0 to 5" are question data, and power values at measurement time points "6 to 11" are answer data.

Figure 22:
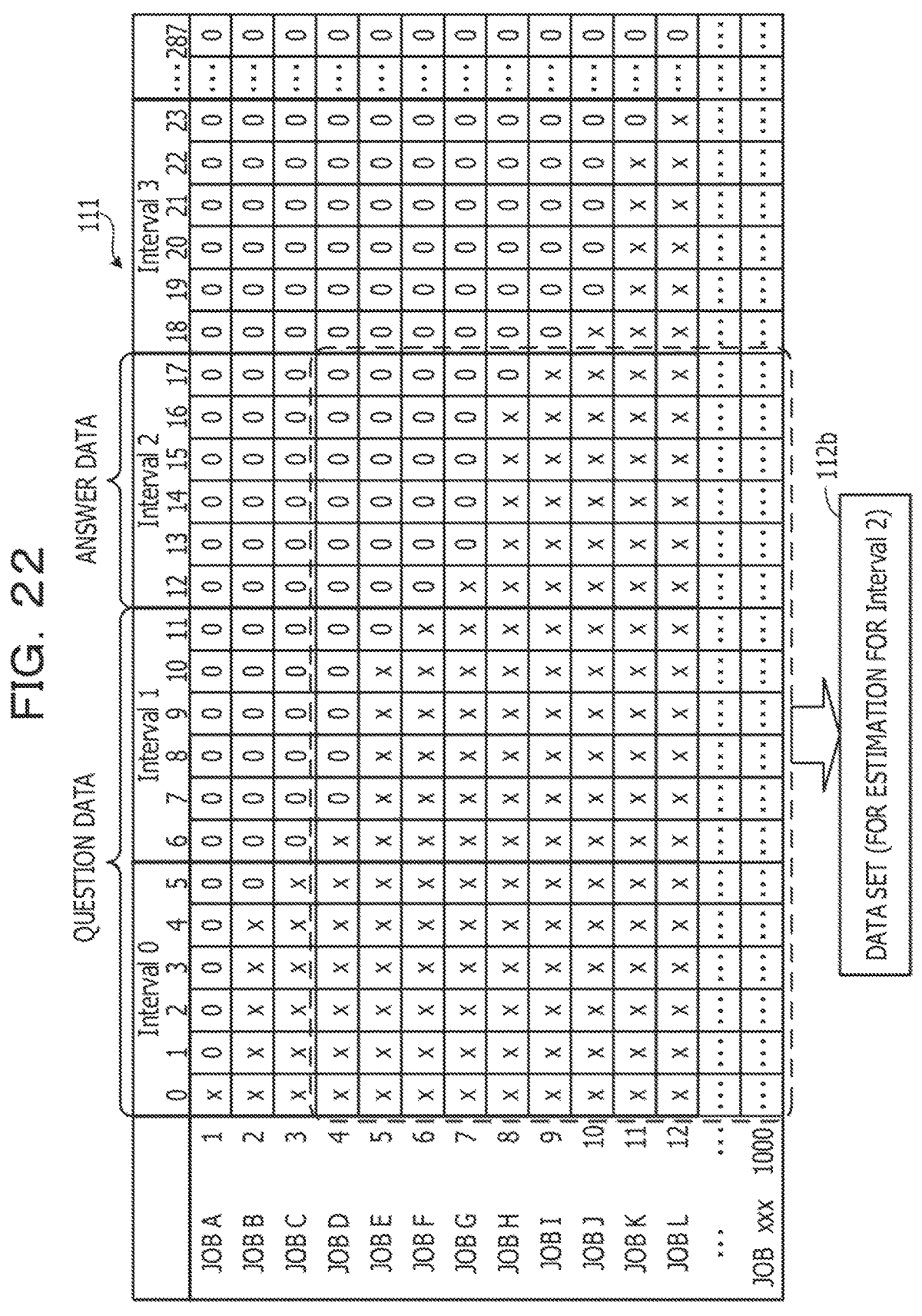

FIG. 22 is a diagram illustrating a second example of the generation of a data set. In the example illustrated in FIG. 22, the data set 112b corresponding to the estimation period of "Interval 2" (x=2) is generated based on the job consumed power information 111. In this case, the sample generator 140 causes time-series power data of jobs that have finished being executed at and after a measurement time point "7" (6×2–5) to be included in the data set 112b. In the data set 112b, power values at measurement time points "0 to 11" are question data, and power values at measurement time points "12 to 17" are answer data.

FIG. 23 is a diagram illustrating a third example of the generation of a data set. In the example illustrated in FIG. 23, the data set 112c corresponding to the estimation period of "Interval 3" (x=3) is generated based on the job consumed power information 111. In this case, the sample generator 140 causes time-series power data of jobs that have finished being executed at and after a measurement time point "13" (6×3–5) to be included in the data set 112c. In the data set 112c, power values at measurement time points "0 to 17" are question data, and power values at measurement time points "18 to 23" are answer data.

The sample generator 140 generates data sets for subsequent estimation periods in the same manner as the data sets 112a, 112b, and 112c illustrated in FIGS. 21 and 22. Then, the sample generator 140 causes a set of all the generated data sets to be stored as the sample data 112 in the DB 110. After that, at a predetermined time, the learning section 150 generates estimation models for the respective estimation periods based on the sample data 112.

Figure 24:
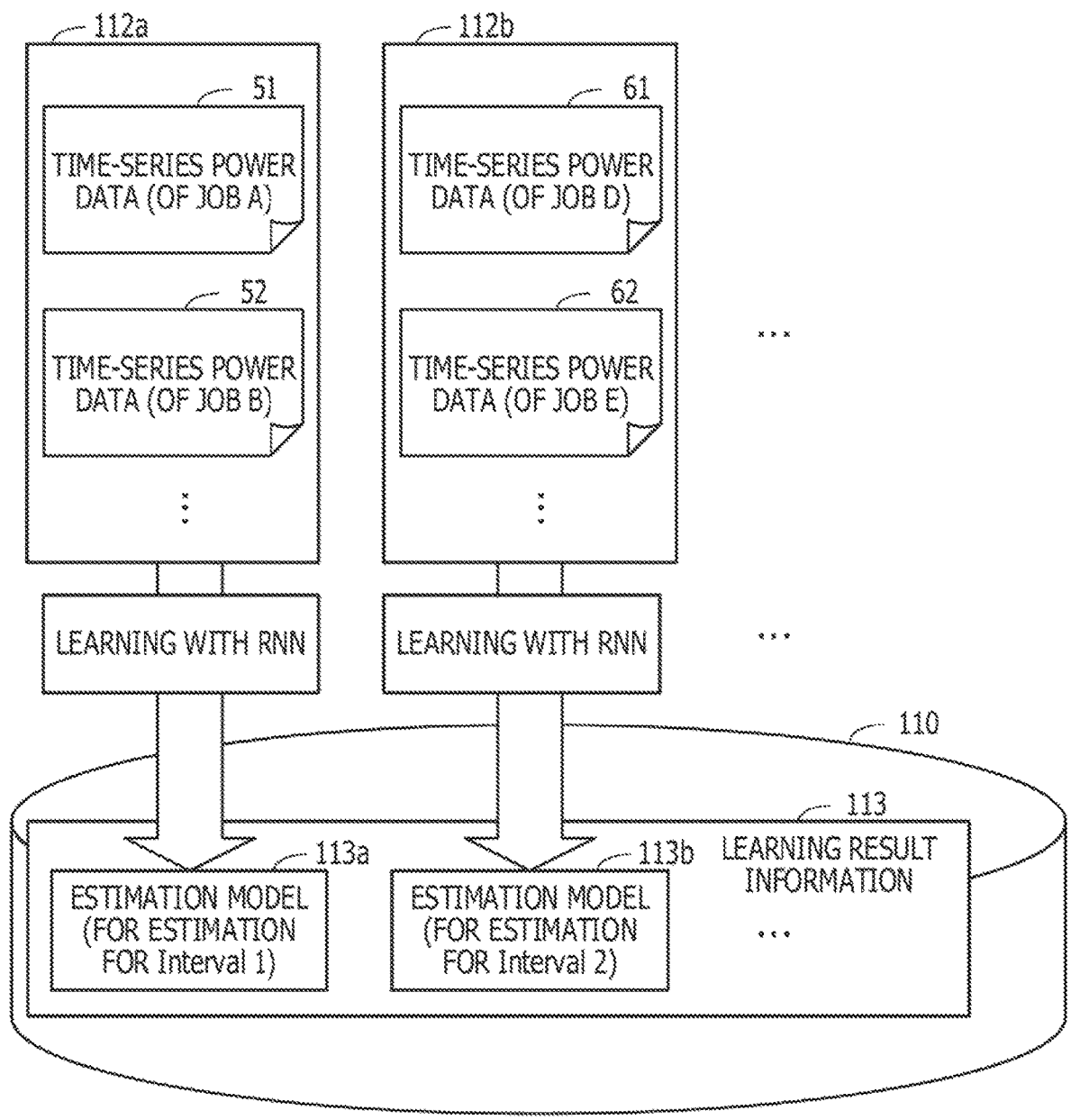
FIG. 24 is a diagram illustrating an overview of a process of generating estimation models.

FIG. 24 is a diagram illustrating an overview of a process of generating estimation models. For example, the learning section 150 executes the learning using the RNN based on time-series power data 51, 52, . . . of the jobs that is included in the data set 112a. Then, the learning section 150 generates the estimation model 113a for estimation for the estimation period of "Interval 1". The learning section 150 executes the learning using the RNN based on time-series power data 61, 62, . . . of the jobs that is included in the data set 112b. Then, the learning section 150 generates the estimation model 113b for estimation for the estimation period of "Interval 2". After that, the learning section 150 executes the learning using the RNN based on data sets for other estimation periods and generates estimation models for the estimation periods in the same manner as described above.

Figure 25:
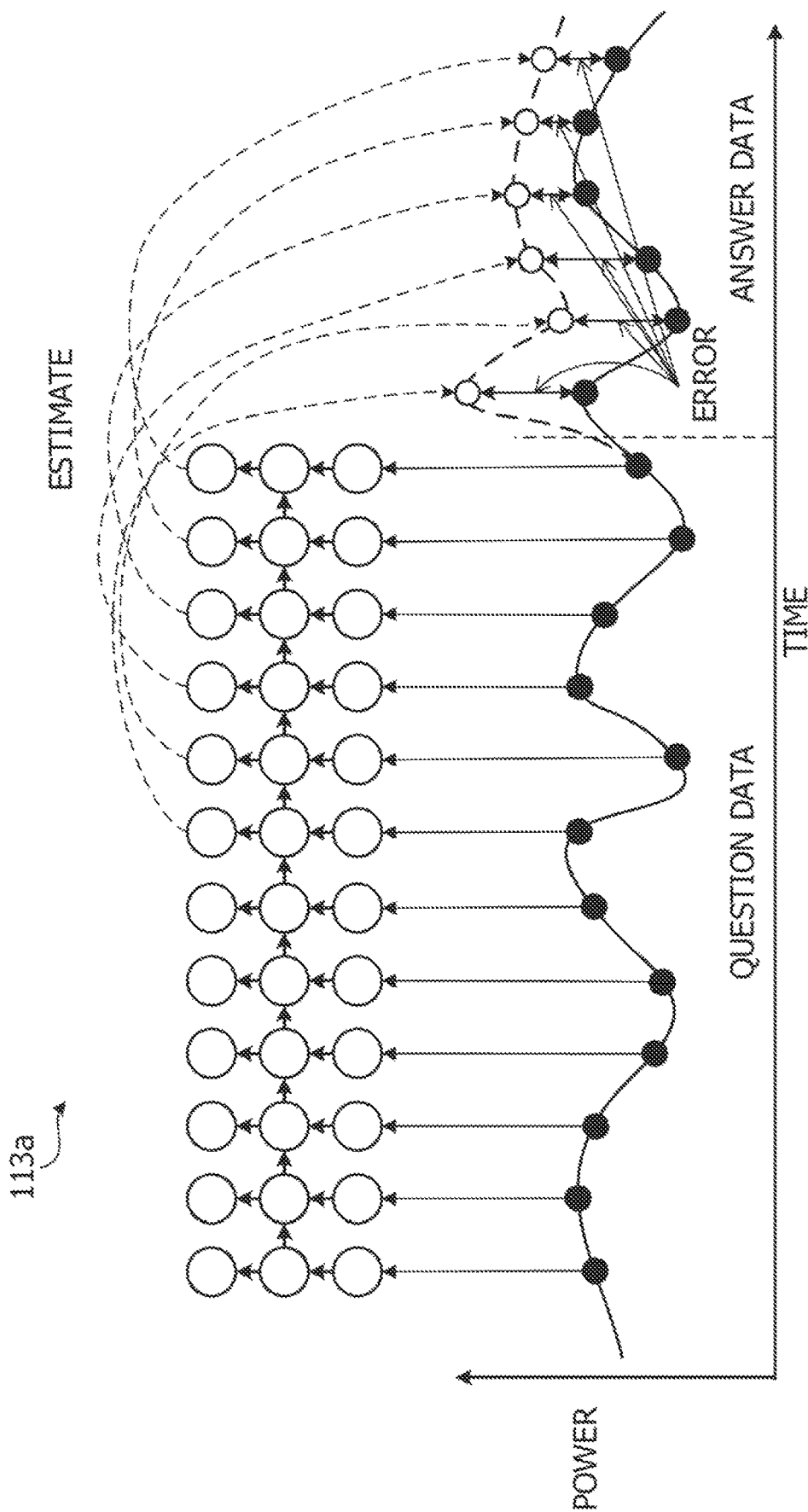
FIG. 25 is a diagram illustrating an example of an estimation model.

FIG. 25 is a diagram illustrating an example of the estimation model. In the example illustrated in FIG. 25, the estimation model 113a for estimating power to be consumed at each of the first to sixth measurement time points is generated. The learning section 150 uses the RNN to estimate power to be consumed for the estimation period based on question data, while reading the data set 112a including time-series power data of the jobs already executed. Then, the learning section 150 calculates differences between estimated values and answer data and learns parameters of weight values that reduce the differences. For example, the learning section 150 uses the back-propagation through time (BPTT) algorithm to learn differences between measured values and the estimated values. The BPTT algorithm executes error back-propagation on neural network weights in the time direction.

Upon acquiring the measured values of power consumed by the jobs being executed, the estimated value calculator 160 may use the estimation model 113a illustrated in FIG.

25 to estimate power to be consumed by the jobs at a plurality of subsequent measurement time points.

A procedure for the process of generating estimation models is described below in detail.

Figure 26:
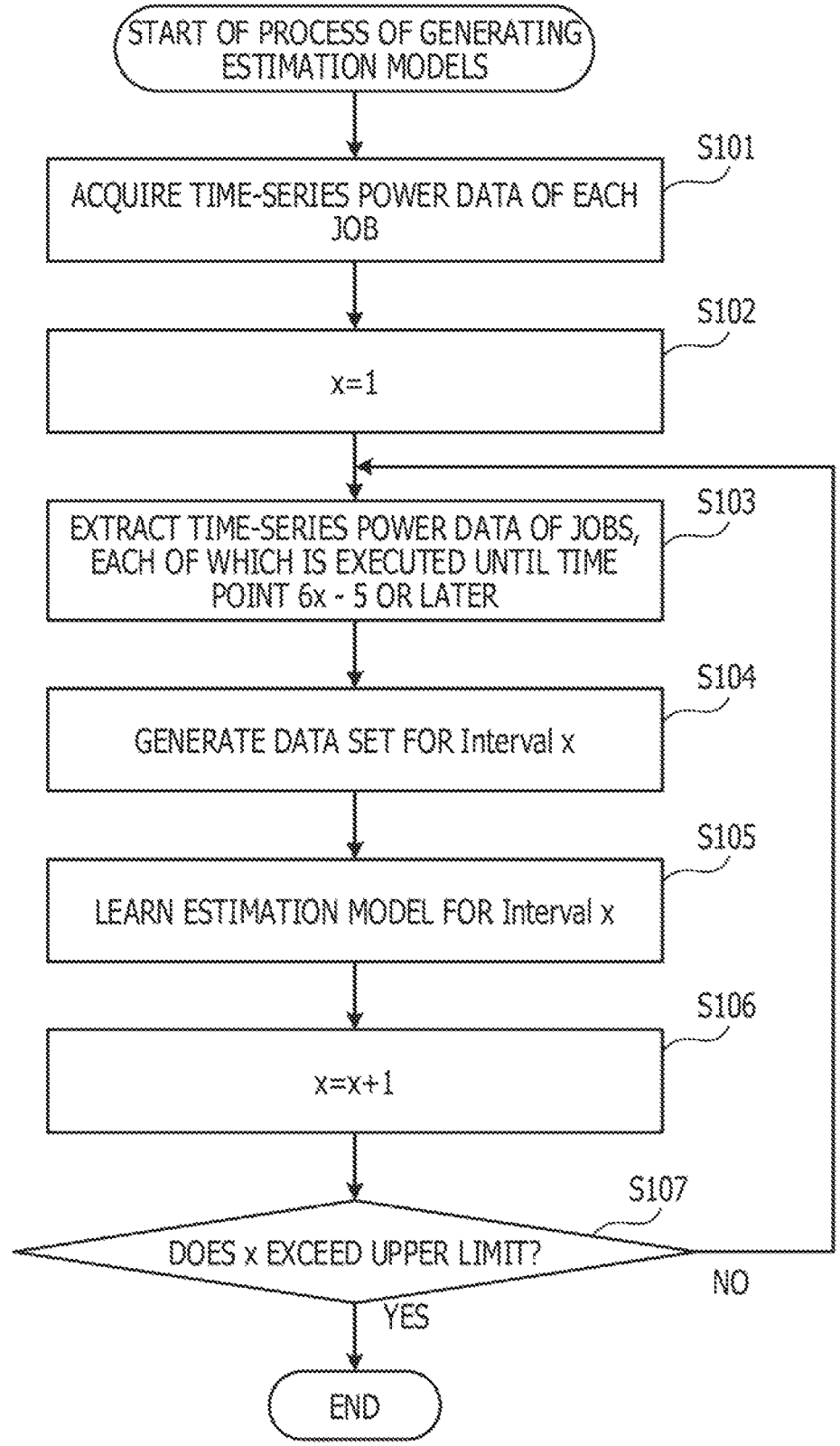
FIG. 26 is a flowchart illustrating an example of a procedure for the process of generating estimation models.

FIG. 26 is a flowchart illustrating an example of the procedure for the process of generating estimation models. Processes illustrated in FIG. 26 are described below in the order of step numbers. The process of generating estimation models is executed in accordance with an instruction output from the timer section 120 at predetermined time intervals. The following description assumes that the maximum value among execution times of jobs is 24 hours and lengths of estimation periods are 30 minutes. In this case, an upper limit on x of "Interval x" is "47".

[Step S161] The metric collector 130 acquires time-series power data of the jobs from the HPC operation managing server 200. The metric collector 130 causes the acquired time-series power data to be stored as the job consumed power information 111 in the DB 110. In this case, the metric collector 130 sets, to "0", all power values at measurement time points when measurement is not executed and that are among measurement time points within a time period corresponding to the maximum value among the execution times of the jobs.

[Step S102] The sample generator 140 sets an initial value "1" to a variable x.

[Step S103] The sample generator 140 extracts, from the job consumed power information 111 stored in the DB 110, time-series power data of jobs, each of which has finished been executed at a measurement time point "6x−5" or later.

[Step S104] The sample generator 140 generates a data set for learning based on the time-series power data extracted in step S103. The generated data set is used to generate a model for estimating power to be consumed for an estimation period (from a measurement time point "6x" to a measurement time point "6x−5") of "Interval x". For example, the sample generator 140 generates a data set in which power values at measurement time points "0" to "6x−1" are question data and power values at measurement time points "6x" to "6x+5" are answer data. The sample generator 140 causes the generated data set to be stored in the DB 110.

[Step S105] The learning section 150 uses the data set generated in step S104 to learn the estimation model for the estimation period of "Interval x" by means of the RNN. The learning section 150 causes the learned estimation model to be stored in the DB 110.

[Step S106] The sample generator 140 adds 1 to the variable x (x=x+1).

[Step S107] The sample generator 140 determines whether the value of x exceeds the upper limit (for example, "47"). When the value of x exceeds the upper limit, the sample generator 140 terminates the process. When the value of x does not exceed the upper limit, the sample generator 140 causes the process to proceed to step S103.

In this manner, the estimation models for the estimation periods are generated. Then, the estimated value calculator 160 uses the estimation models to calculate estimated values of time-series changes in power to be consumed by jobs being executed for predetermined subsequent time periods (of, for example, 30 minutes).

Figure 27:
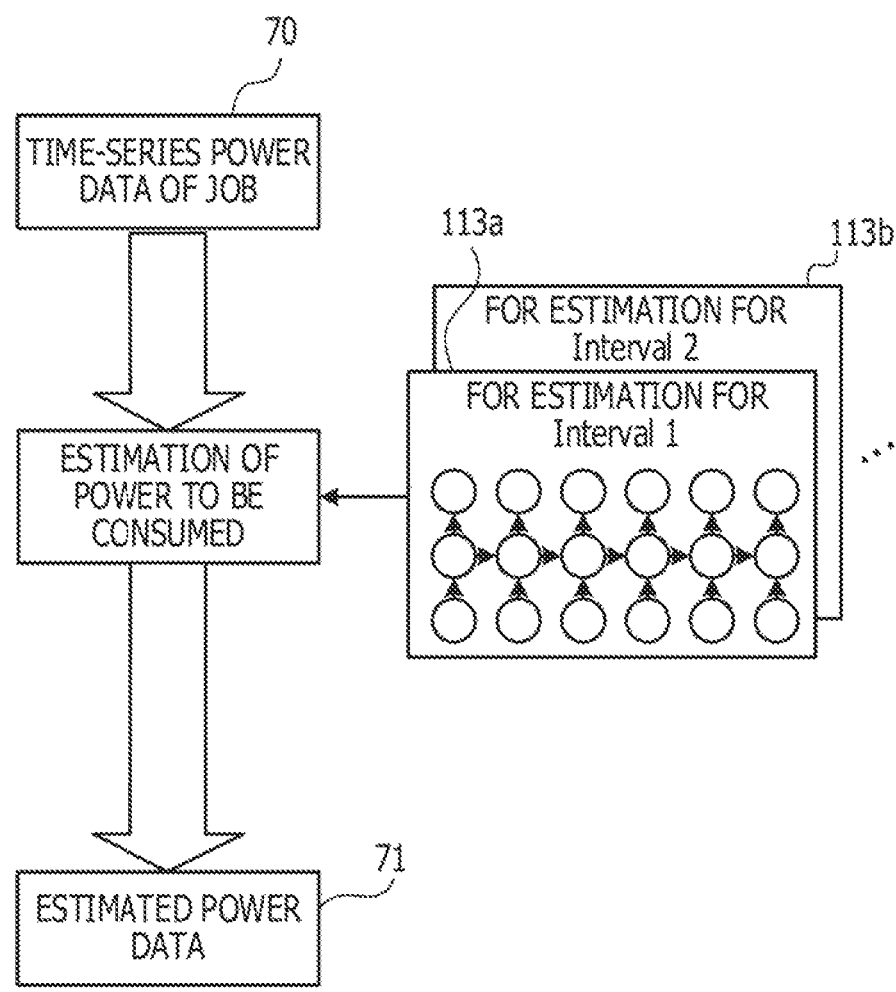
FIG. 27 is a diagram illustrating an overview of a process of estimating power to be consumed.

FIG. 27 is a diagram illustrating an overview of a process of estimating power to be consumed. For example, when a job newly starts being executed, the estimated value calculator 160 waits for the metric collector 130 to acquire time-series power data 70 of the job for a fixed time period. When the time-series power data 70 is acquired, the estimated value calculator 160 selects, from among the plurality of estimation models 113a, 113b, ..., an estimation model corresponding to the next estimation period. Then, the estimated value calculator 160 inputs the time-series power data 70 to the selected estimation model and estimates power to be consumed by the job for the next estimation period. The estimated value calculator 160 causes estimated power data 71 indicating the result of the estimation to be stored in the DB 110.

Next, a procedure for a process of estimating power is described in detail.

Figure 28:
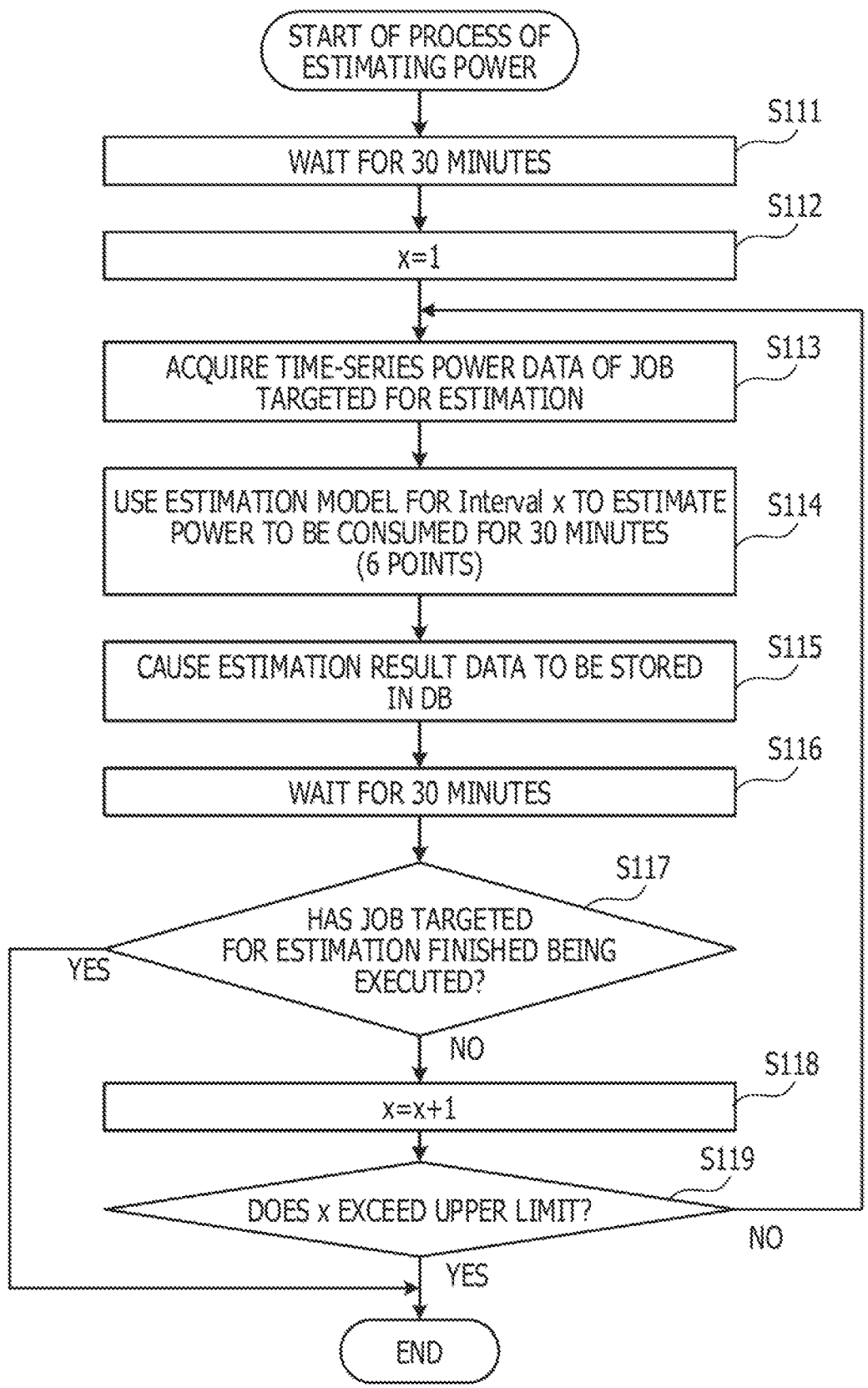
FIG. 28 is a flowchart illustrating an example of a procedure for a process of estimating power.

FIG. 28 is a flowchart illustrating an example of the procedure for the process of estimating power. Processes illustrated in FIG. 28 are described in the order of step numbers. The process of estimating power is executed every time a job newly starts being executed.

[Step S111] The estimated value calculator 160 sets a job started being executed as a job targeted for estimation. Then, the estimated value calculator 160 waits for 30 minutes after the start of the execution of the job targeted for estimation. The waiting time of 30 minutes is measured by, for example, the timer section 120. In this case, the estimated value calculator 160 receives a notification indicating the elapse of 30 minutes from the timer section 120 and causes the process to proceed to next step S112.

[Step S112] The estimated value calculator 160 sets the initial value of "1" to the variable x.

[Step S113] The metric collector 130 acquires, from the HPC operation managing server 200, time-series power data of the job targeted for estimation. Then, the metric collector 130 causes the acquired time-series power data to be stored in the DB 110. In this case, the metric collector 130 sets a power value of "0" for all measurement time points in a time period (from the current time to a time point when a time period corresponding to the maximum value among the execution times of the jobs elapses) for which power information does not exist. When the job is already completed, the metric collector 130 sets the power value of "0" for measurement time points in a time period from the end of the execution of the job for the measurement time point when the time period corresponding to the maximum value among the execution times of the job elapses.

[Step S114] The estimated value calculator 160 sets a time period of "Interval x" as an estimation period and uses an estimation model for the time period to estimate power to be consumed by the job targeted for estimation at measurement time points (for example, 6 time points at fixed time intervals of 5 minutes) in a subsequent time period of 30 minutes. For example, the estimated value calculator 160 estimates power to be consumed at the 6 measurement time points "6x" to "6x+5" based on power values at the measurement time points "0" to "6x−1" indicated in the time-series power data of the job targeted for estimation.

[Step S115] The estimated value calculator 160 assigns a job name of the job targeted for estimation and the current time to information indicating the power estimated to be consumed and causes the information with the assigned job name and the assigned time to be stored as estimation result data in the DB 110.

[Step S116] The estimated value calculator 160 waits for only 30 minutes. The waiting time of 30 minutes is measured by, for example, the timer section 120. In this case, the estimated value calculator 160 receives a notification indicating the elapse of 30 minutes from the timer section 120 and causes the process to proceed to next step S117.

[Step S117] The estimated value calculator 160 determines whether the job targeted for estimation has finished being executed. For example, when power consumed by the job targeted for estimation changes to "0", the estimated value calculator 160 may determine that the job has finished being executed. When the job targeted for estimation has finished being executed, the estimated value calculator 160 terminates the process of estimating power. When the job targeted for estimation has not finished being executed, the estimated value calculator 160 causes the process to proceed to step S118.

[Step S118] The estimated value calculator 160 adds 1 to the variable x (x=x+1).

[Step S119] The estimated value calculator 160 determines whether the value of x exceeds the upper limit (for example, "47"). When the value of x exceeds the upper limit, the estimated value calculator 160 terminates the process. When the value of x does not exceed the upper limit, the estimated value calculator 160 causes the process to proceed to step S113.

In this manner, an appropriate estimation model may be used to estimate power to be consumed and the accuracy of calculating an estimated value is improved.

Next, a procedure for a process of forcibly stopping a job by the HPC operation managing server 200 is described.

Figure 29:
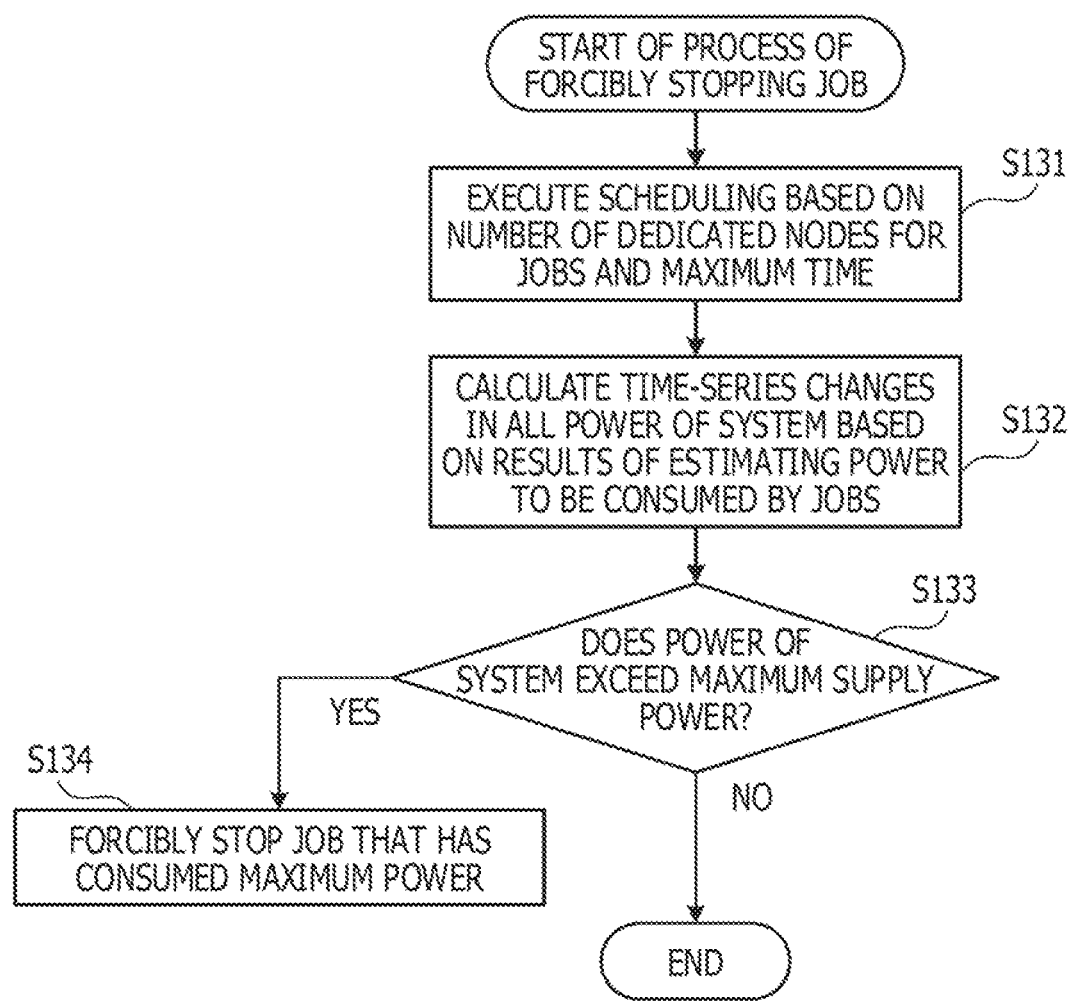
FIG. 29 is a flowchart illustrating an example of a procedure for a process of forcibly stopping a job.

FIG. 29 is a flowchart illustrating an example of the procedure for the process of forcibly stopping a job. Processes illustrated in FIG. 29 are described in the order of step numbers.

[Step S131] The job scheduling section 240 executes the job scheduling based on the number of dedicated nodes for jobs and the maximum time. Results of the scheduling are transmitted to the control instructing section 250. The control instructing section 250 instructs the HPC system 30 to execute the jobs in accordance with a schedule.

[Step S132] When the job scheduling section 240 receives results of estimating power to be consumed by the jobs being executed, the job scheduling section 240 calculates time-series changes in all power to be consumed by the HPC system 30 based on the received estimation results. For example, the job scheduling section 240 sums power waveforms of the jobs and treats the result of the summing as the power of the HPC system 30.

[Step S133] The job scheduling section 240 determines whether the power of the HPC system 30 exceeds the maximum supply power. When the power of the HPC system 30 exceeds the maximum supply power, the job scheduling section 240 causes the process to proceed to step S134. When the power of the HPC system 30 does not exceed the maximum supply power, the job scheduling section 240 terminates the process.

[Step S134] The job scheduling section 240 forcibly stops one job being executed. For example, the job scheduling section 240 forcibly stops a job that has consumed the maximum power among the jobs being executed. After that, the job scheduling section 240 causes the process to proceed to step S133.

As described above, power to be consumed by the HPC system 30 is able to be controlled based on results of estimating power to be consumed by the jobs being executed so that power consumed by the HPC system 30 does not exceed the maximum supply power. Since the results of estimating power to be consumed by the jobs being executed are correct, a job is not wastefully forcibly stopped and the execution efficiency of the jobs is improved. Since the results of estimating power to be consumed by the jobs being executed are correct, it is possible to suppress unexpected excess of power consumed by the HPC system 30 over the maximum supply power, and the stability of the HPC system 30 is improved.

Next, differences between power estimated by the technique applied in the second embodiment to be consumed and power actually consumed are described.

FIG. 30 is a diagram illustrating comparison of an average error in the applied technique with an average error in the comparative example. In FIG. 30, an average error of power estimated by the technique described in the second embodiment to be consumed for 30 minutes is compared with an average error of power estimated using the estimation model described in the comparative example with reference to FIG. 8 to be consumed for 30 minutes.

For the applied technique, an average error of power estimated to be consumed by a normal job that consumes power of less than 2 MW and an average error of power estimated to be consumed by a large job that consumes power of 2 MW or more are indicated. For the comparative example, an average error of power estimated to be consumed by the large job that consumes power of 2 MW or more is indicated.

When power to be consumed by the normal job is estimated by the applied technique described in the second embodiment, the estimation may be executed with an error of 5.5%. When power to be consumed by the large job is estimated by the applied technique described in the second embodiment, the estimation may be executed with an error of 8.8%. On the other hand, when power to be consumed by the large job is estimated by the estimation model described in the comparative example, the estimation is executed with an error of 65.0%. In this manner, according to the applied technique described in the second embodiment, power to be consumed by a job may be estimated with high accuracy.

Figure 31:
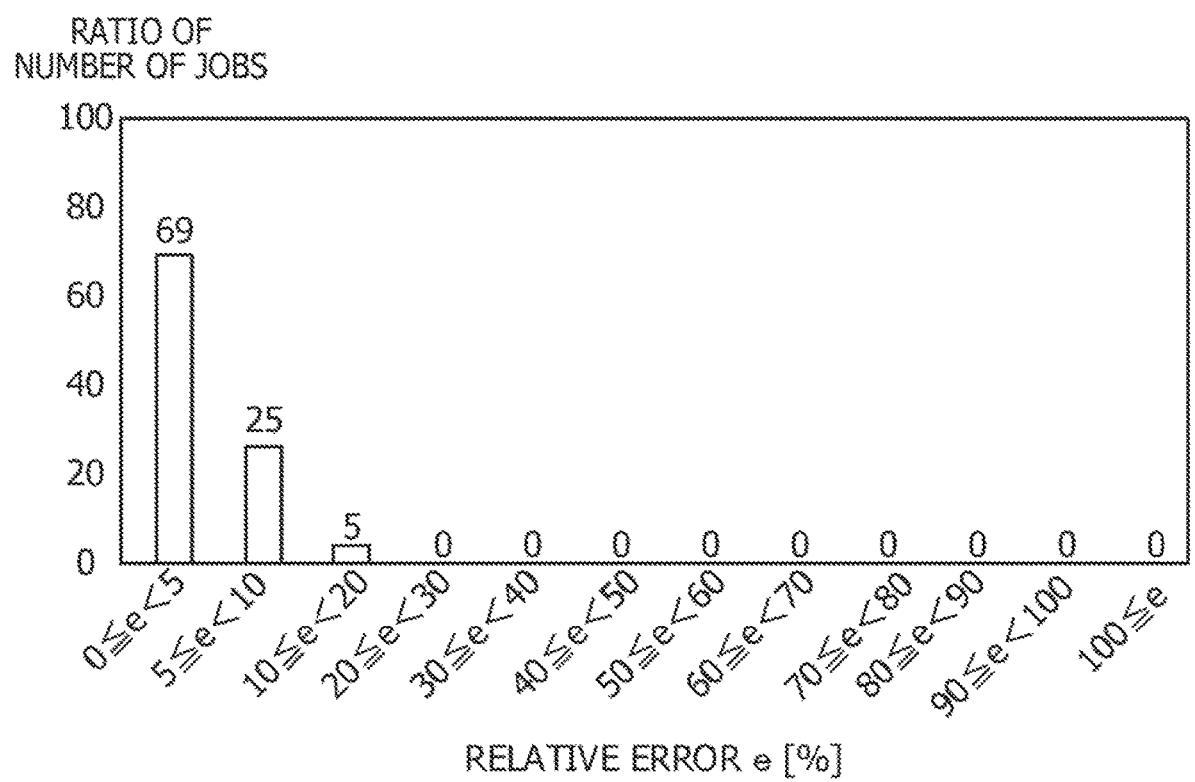
FIG. 31 is a diagram illustrating a distribution of relative errors of results of estimating power to be consumed by normal jobs.

FIG. 31 is a diagram illustrating a distribution of relative errors of results of estimating power to be consumed by normal jobs. In FIG. 31, an abscissa indicates a range of relative errors and an ordinate indicates the ratio of the number of jobs with the errors in the range corresponding to an estimation result to the number of all the jobs. In the example illustrated in FIG. 31, jobs with relative errors of 0% or higher and less than 5% are 69% of all the jobs. Jobs with relative errors of 5% or higher and less than 10% are 25% of all the jobs. Jobs with relative errors of 10% or higher and less than 20% are 5% of all the jobs. As described above, relative errors of most of normal jobs are less than 20%.

Figure 32:
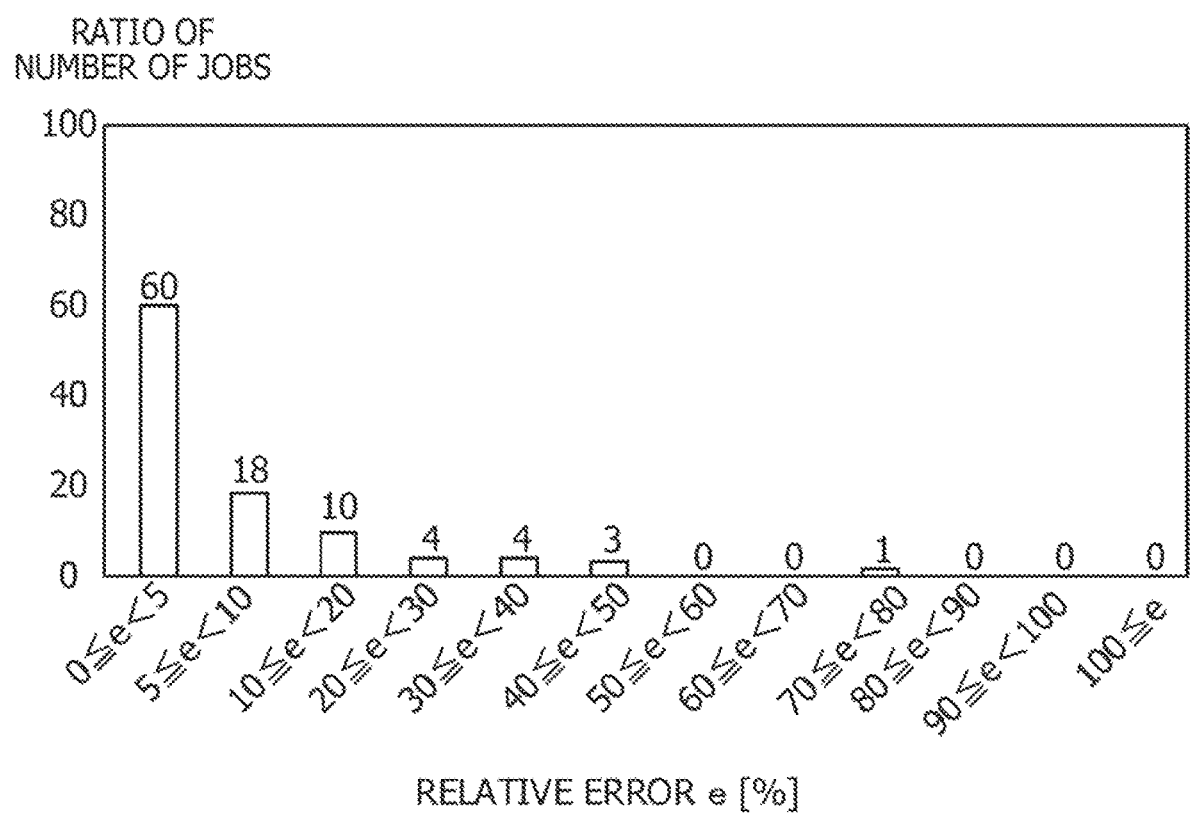
FIG. 32 is a diagram illustrating a distribution of relative errors of results of estimating power to be consumed by large jobs.

FIG. 32 is a diagram illustrating a distribution of relative errors of results of estimating power to be consumed by large jobs. In FIG. 32, an abscissa indicates a range of relative errors and an ordinate indicates the ratio of the number of jobs with the errors in the range corresponding an estimation result to the number of all the jobs. In the example illustrated in FIG. 32, jobs with relative errors of 0% or higher and less than 5% are 60% of all the jobs. Jobs with relative errors of 5% or higher and less than 10% are 18% of all the jobs. Jobs with relative errors of 10% or higher and less than 20% are 10% of all the jobs. Jobs with relative errors of 20% or higher and less than 30% are 4% of all the jobs. Jobs with relative errors of 30% or higher and less than 40% are 4% of all the jobs. Jobs with relative errors of 40% or higher and less than 50% are 3% of all the jobs. Jobs with relative errors of 70% or higher and less than 80% are 1% of all the jobs. As described above, although the relative errors of the large jobs are larger than those of the normal jobs, the relative errors of 60% of the large jobs are less than 5%, and high estimation accuracy is realized.

Power to be consumed by jobs may be correctly estimated. Therefore, when a contract on an electric power fee is made based on an on-demand pricing system, power to be consumed by the HPC system 30 may be appropriately controlled so that power consumed by the HPC system 30 does not exceed contract power.

Figure 33:
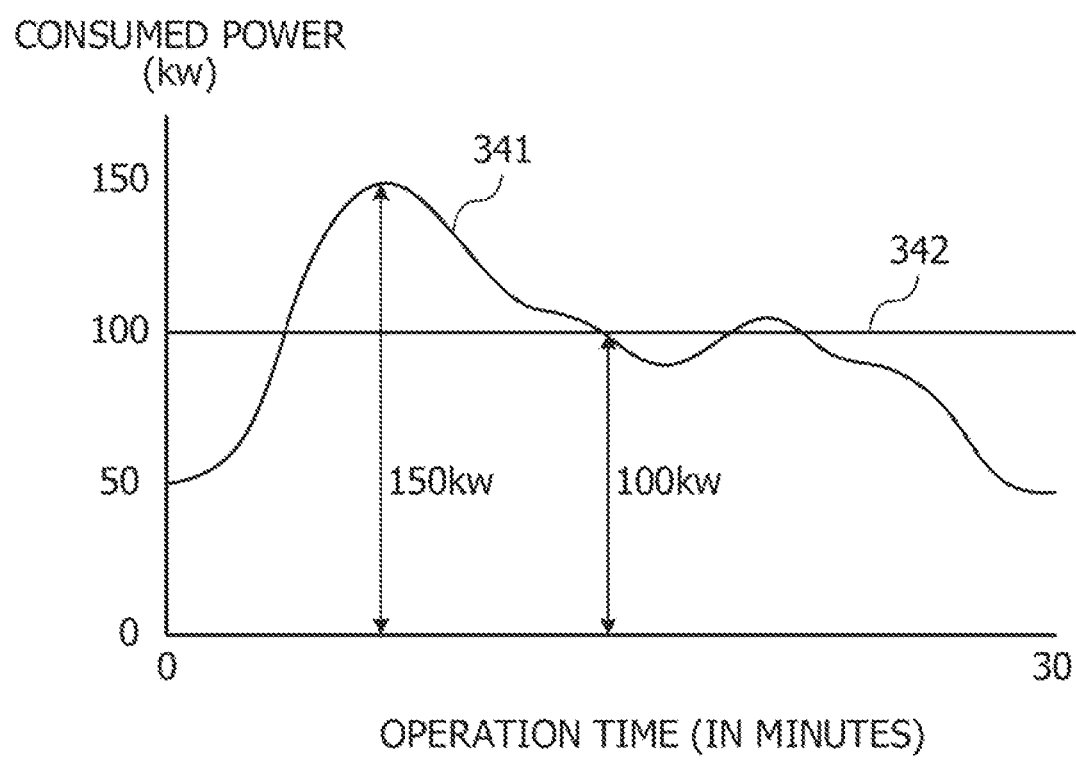
FIG. 33 is a diagram describing an on-demand pricing system.

FIG. 33 is a diagram describing the on-demand pricing system. FIG. 33 illustrates a graph of a power waveform 341 indicating power consumed by the entire HPC system 30. An abscissa of the graph indicates an operation time of the HPC system and an ordinate of the graph indicates power consumed. Average power 342 of power that changes for a predetermined time period (of, for example, 30 minutes) and is indicated by the power waveform 341 is the amount of power used for the time period. In the example illustrated in FIG. 33, instantaneous maximum consumption power is 150 kw, and the amount of power used is calculated to be 100 kw.

According to the on-demand pricing system, an electric power fee for each month is calculated using an equation of "an electric power fee=a contract electric power fee+ an electric power unit fee× the amount of power used for one month". Since a large amount of power is consumed by the HPC system 30, the contract electric power fee is high. The contract electric power fee is determined based on the amount (maximum demand power) of power consumed for a time period of 30 minutes in which the maximum amount of power has been used in the last year (past one year). Therefore, when the amount of power used in a unit time zone of 30 minutes exceeds the contract power even once, an electric power fee for the next year increases.

When power consumed by a newly input job is correctly estimated, the HPC operation managing server 200 may appropriately determine whether the amount of power to be used in a subsequent time zone of 30 minutes is likely to exceed the maximum demand power in the past one year. When the HPC operation managing server 200 determines that the amount of power to be used in the time zone of 30 minutes is likely to exceed the maximum demand power in the past one year, the HPC operation managing server 200 delays the start of the execution of the newly input job or forcibly stops a job being executed, and may suppress the excess of the amount of power used over the maximum demand power in the past one year. As a result, the electric power fee is suppressed.

Other Embodiments

In the second embodiment, the efficiency of the processes is improved by reducing amounts of data sets, compared to the second modification example illustrated in FIG. 10. The managing server 100, however, may use the data sets described in the second modification example to generate the estimation models.

Although the embodiments are exemplified, the configuration of each of the sections described in the embodiments may be replaced with another configuration having the same functions as those described in the embodiments. Another arbitrary constituent section and another arbitrary process may be added. Arbitrary two or more configurations (characteristics) among the configurations described in the embodiments may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a processor included in a computer to execute a process, the process comprising:
    acquiring, based on a change in power consumed from start time to end time of an execution of a first job, first consumed power information indicating a change in power consumed for a first time period from the start time to first time, second consumed power information indicating a change in power consumed for a second time period from the first time to second time, and third consumed power information indicating a change in power consumed for a third time period from the second time to the end time, the second time being after the first time;
    generating, from the first consumed power information, a first estimation model for estimating power to be consumed by a job that takes less than the first time period and the second time period to end, by modifying parameters of the first estimation model so that difference between the second consumed power information and output of the first estimation model input the first consumed power information is decreased; and
    generating, from the second consumed power information, a second estimation model for estimating power to be consumed by a job that takes more than or equal to the first time period and the second time period to end, by modifying parameters of the second estimation model so that difference between the third consumed power information and output of the second estimation model input the first consumed power information and the second consumed power information is decreased.

2. The non-transitory computer-readable storage medium according to claim 1, the process further comprising:
    acquiring fourth consumed power information indicating a change in power consumed by an execution of a second job for the first time period;
    estimating fifth consumed power information indicating a change in power consumed by the execution of the second job for the second time period by inputting the fourth consumed power information to the first estimation model;
    when the second job does not end by the second time period,
        acquiring sixth consumed power information indicating a change in power consumed by the execution of the second job for the second time period, and
        estimating seventh consumed power information indicating a change in power consumed by the execution of the second job for the third time period by inputting the fourth consumed power information and the sixth consumed power information to the second estimation model.

3. The non-transitory computer-readable storage medium according to claim 1, wherein a plurality of the first jobs exist and the first estimation model is generated based on a plurality of pieces of first consumed power information indicating changes in power consumed by the plurality of first jobs.

4. The non-transitory computer-readable storage medium according to claim 3, wherein one or more first jobs whose execution times are from start of the execution to end of the execution and longer than a threshold are extracted from the plurality of first jobs, and the first estimation model is generated based on a time-series change in power to be consumed by the extracted one or more first jobs.

5. The non-transitory computer-readable storage medium according to the claim 2, wherein the process further comprising:
  determining when total consumed power of a system that perform the second job till the second time period is more than or equal to a certain threshold based on the fifth consumed power information;
  when the total consumed power is more than or equal to the certain threshold, stopping a job performed by the system; and
  when the total consumed power is less than to the certain threshold, acquiring the sixth consumed power information.

6. A power estimation method comprising:
  acquiring, based on a change in power consumed from start time to end time of an execution of a first job, first consumed power information indicating a change in power consumed for a first time period from the start time to first time second consumed power information indicating a change in power consumed for a second time period from the first time to second time, and third consumed power information indicating a change in power consumed for a third time period from the second time to the end time, the second time being after the first time;
  generating, from the first consumed power information, a first estimation model for estimating power to be consumed by a job that takes less than the first time period and the second time period to end, by modifying parameters of the first estimation model so that difference between the second consumed power information and output of the first estimation model input the first consumed power information is decreased; and
  generating, from the second consumed power information, a second estimation model for estimating power to be consumed by a job that takes more than or equal to the first time period and the second time period to end, by modifying parameters of the second estimation model so that difference between the third consumed power information and output of the second estimation model input the first consumed power information and the second consumed power information is decreased.

7. The power estimation method according to claim 6, further comprising:
  acquiring fourth consumed power information indicating a change in power consumed by an execution of a second job for the first time period;
  estimating fifth consumed power information indicating a change in power consumed by the execution of the second job for the second time period by inputting the fourth consumed power information to the first estimation model;
  when the second job does not end by the second time period,
    acquiring sixth consumed power information indicating a change in power consumed by the execution of the second job for the second time period, and
    estimating seventh consumed power information indicating a change in power consumed by the execution of the second job for the third time period by inputting the fourth consumed power information and the sixth consumed power information to the second estimation model.

8. The power estimation method according to claim 6, wherein a plurality of the first jobs exist and the first estimation model is generated based on a plurality of pieces of first consumed power information indicating changes in power consumed by the plurality of first jobs.

9. The power estimation method according to claim 8, wherein one or more first jobs whose execution times are from start of the execution to end of the execution and longer than a threshold are extracted from the plurality of first jobs, and the first estimation model is generated based on a time-series change in power to be consumed by the extracted one or more first jobs.

10. The power estimation method according to the claim 7, wherein the process further comprising:
  determining when total consumed power of a system that perform the second job till the second time period is more than or equal to a certain threshold based on the fifth consumed power information;
  when the total consumed power is more than or equal to the certain threshold, stopping a job performed by the system; and
  when the total consumed power is less than to the certain threshold, acquiring the sixth consumed power information.

11. A power estimating device comprising:
  a memory; and
  circuitry coupled to the memory and configured to:
  acquire, based on a change in power consumed from start time to end time of an execution of a first job, first consumed power information indicating a change in power consumed for a first time period from the start time to first time, second consumed power information indicating a change in power consumed for a second time period from the first time to second time, and third consumed power information indicating a change in power consumed for a third time period from the second time to the end time, the second time being after the first time;
  generate, from the first consumed power information, a first estimation model for estimating power to be consumed by a job that takes less than the first time period and the second time period to end, by modifying parameters of the first estimation model so that difference between the second consumed power information and output of the first estimation model input the first consumed power information is decreased; and
  generate, from the second consumed power information, a second estimation model for estimating power to be consumed by a job that takes more than or equal to the first time period and the second time period to end, by modifying parameters of the second estimation model so that difference between the third consumed power information and output of the second estimation model input the first consumed power information and the second consumed power information is decreased.

12. The power estimating device according to claim 11, wherein the circuitry is further configured to:
  acquire fourth consumed power information indicating a change in power consumed by an execution of a second job for the first time period;
  estimate fifth consumed power information indicating a change in power consumed by the execution of the second job for the second time period by inputting the fourth consumed power information to the first estimation model;
  when the second job does not end by the second time period, acquire sixth consumed power information indicating a change in power consumed by the execution of the second job for the second time period, and estimate seventh consumed power information indicating a change in power consumed by the execution of the second job for the third time period by inputting the fourth consumed power information and the sixth consumed power information to the second estimation model.

13. The power estimating device according to claim 11, wherein a plurality of the first jobs exist and the first estimation model is generated based on a plurality of pieces of first consumed power information indicating changes in power consumed by the plurality of first jobs.

14. The power estimating device according to claim 13, wherein one or more first jobs whose execution times are from start of the execution to end of the execution and longer than a threshold are extracted from the plurality of first jobs, and the first estimation model is generated based on a time-series change in power to be consumed by the extracted one or more first jobs.

15. The power estimating device according to the claim 12, wherein the circuitry is further configured to:
    determine when total consumed power of the power estimating device till the second time period is more than or equal to a certain threshold based on the fifth consumed power information;
    when the total consumed power is more than or equal to the certain threshold, stop a job performed by the power estimating device; and
    when the total consumed power is less than to the certain threshold, acquire the sixth consumed power information.

* * * * *